Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 1

INVENTOR.
ROBERT M. BECK
BY Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 2

INVENTOR.
ROBERT M. BECK

BY

Herbert E. Metcalf
ATTORNEY

INVENTOR.
ROBERT M. BECK
BY Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 4

INVENTOR.
ROBERT M. BECK

BY Herbert E. Metcalf
ATTORNEY

AUTOMATIC CODING SYSTEM FOR A DIGITAL DIFFERENTIAL ANALYZER

Filed Dec. 16, 1952 14 Sheets-Sheet 5

INVENTOR.
ROBERT M. BECK
BY Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 6

INVENTOR.
ROBERT M. BECK
BY
Herbert E. Metcalf
ATTORNEY

AUTOMATIC CODING SYSTEM FOR A DIGITAL DIFFERENTIAL ANALYZER

Filed Dec. 16, 1952 14 Sheets-Sheet 7

*INVENTOR.*
*ROBERT M. BECK*
*BY* Herbert E. Metcalf
*ATTORNEY*

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 8

INVENTOR.
ROBERT M. BECK
BY
Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 9

INVENTOR.
ROBERT M. BECK
BY Herbert E. Metcalf
ATTORNEY

INVENTOR.
ROBERT M. BECK
BY Herbert E. Metcalf
ATTORNEY

AUTOMATIC CODING SYSTEM FOR A DIGITAL DIFFERENTIAL ANALYZER

Filed Dec. 16, 1952 14 Sheets-Sheet 11

INVENTOR.
ROBERT M. BECK
BY
Herbert E. Metcalf
ATTORNEY

INVENTOR.
ROBERT M. BECK
BY
Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 13

INVENTOR.
ROBERT M. BECK

BY Herbert E. Metcalf
ATTORNEY

Sept. 16, 1958 R. M. BECK 2,852,187

AUTOMATIC CODING SYSTEM FOR A DIGITAL DIFFERENTIAL ANALYZER

Filed Dec. 16, 1952 14 Sheets-Sheet 14

INVENTOR.
ROBERT M. BECK
BY Herbert E. Metcalf
ATTORNEY

United States Patent Office 2,852,187

Patented Sept. 16, 1958

2,852,187

AUTOMATIC CODING SYSTEM FOR A DIGITAL DIFFERENTIAL ANALYZER

Robert M. Beck, Inglewood, Calif., assignor to Northrop Aircraft, Incorporated, Hawthorne, Calif., a corporation of California Application December 16, 1952, Serial No. 326,257

15 Claims. (Cl. 235—61)

This invention relates to digital differential analyzers and more particularly to a system for automatically coding a digital differential analyzer so that the analyzer will become available in a minimum amount of time to obtain the solution of a mathematical problem.

In co-pending application Serial No. 217,478, filed March 26, 1951, by Floyd G. Steele and William F. Collison, a digital differential analyzer is disclosed for solving complex differential equations by digital steps. The analyzer has the advantages of the digital computer in that it produces a quick and accurate solution of mathematical problems. The analyzer also has the advantages of a differential machine in that it requires a minimum number of components to obtain such mathematical solutions. The number of components are further reduced because of the logical system of component operation which has been incorporated into the machine. Because of these advantages, the analyzer requires a relatively small amount of space to solve complex differential equations.

Before a problem can be solved, the analyzer must be coded in a plurality of pulse positions to provide information representing the problem. Until now, this coding has required a long period of time to be completed. Since much of the coding has had to be performed manually, the long period of time required to perform the coding operation has considerably nullified the advantage that the machine has in obtaining a quick and accurate solution of a problem.

This invention provides a system for automatically coding an analyzer in a particular pattern individual to the problem to be solved. The system performs the coding operation in a minimum amount of time by coding only those positions in the analyzer involved in the solution of the problem and by skipping over the remaining positions in the analyzer. The system performs the coding operation in an accurate and reliable manner and provides a check for insuring that the coding has been properly completed.

An object of this invention is to provide a system for operating in conjunction with a digital differential analyzer to code the analyzer in accordance with the information representing a problem to be solved.

Another object is to provide a system of the above character for automatically coding the analyzer in a minimum amount of time in accordance with a problem to be solved.

A further object is to provide a system of the above character for providing a check to insure that the coding operation is being satisfactorily performed.

Still another object is to provide a system of the above character for automatically converting the coding information on a tape into a corresponding magnetic pattern on a drum forming a part of the analyzer.

A still further object is to provide a system of the above character for operating in a logical and sequential pattern to code each pulse position in the magnetic drum with a proper magnetic pattern.

Other objects and advantages will be apparent from a detailed description of the invention and from the appended drawings and claims.

Figure 11:
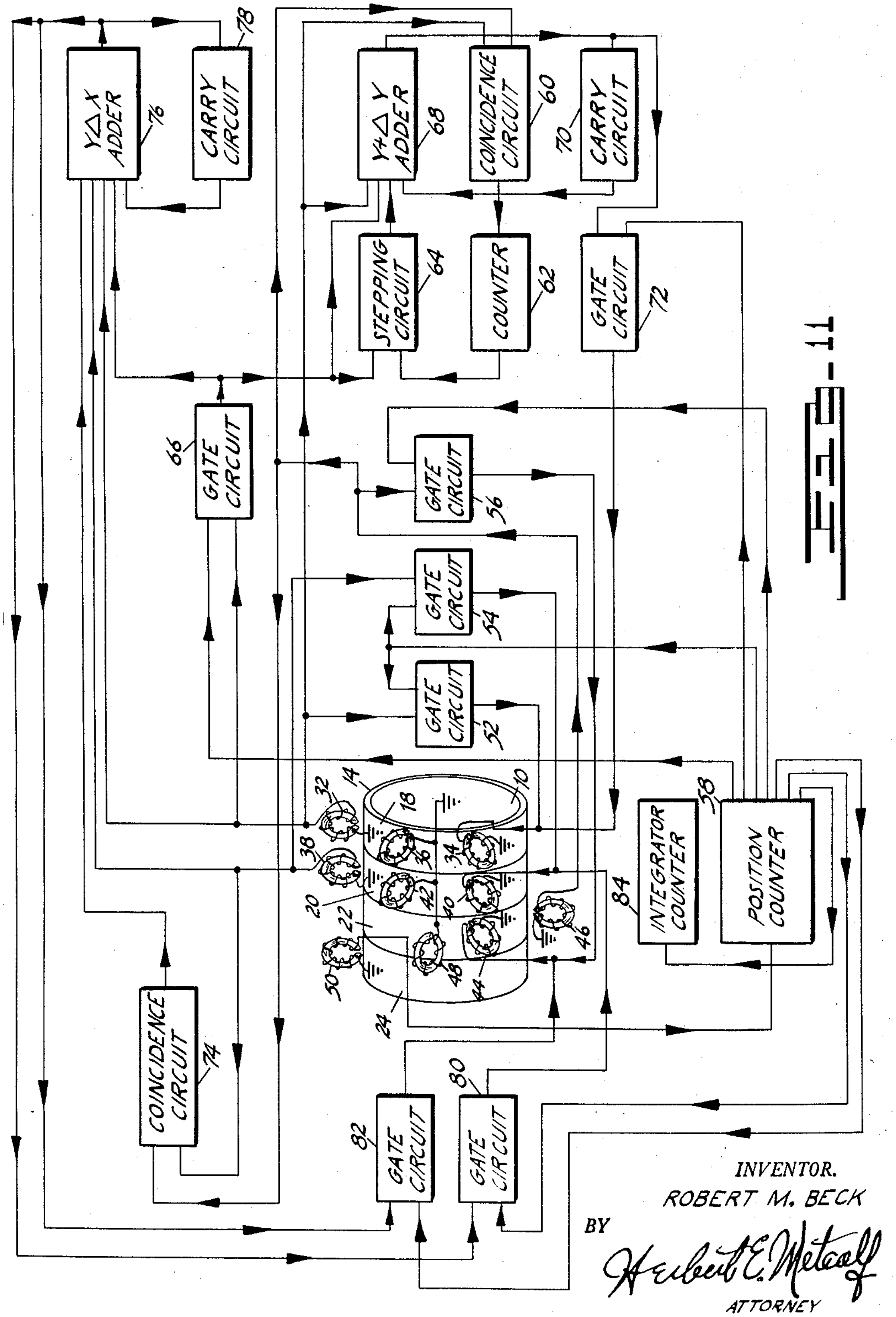
Figure 11 is a schematic diagram, partly in block form and partly in perspective, of a digital differential analyzer intended for use in conjunction with the system shown in Figures 1 to 8, inclusive.

The digital differential analyzer shown in Figure 11 is adapted to solve differential problems by digital steps. The analyzer includes a drum 10 adapted to be rotated by a suitable motor (not shown). A thin coating 14 of magnetic material is applied on the periphery of the drum. The coating 14 can be considered as being divided into a plurality of channels 18, 20, 22 and 24, each of which completely encircles the drum.

The circumferential distance of each channel may be considered as being subdivided into a plurality of positions. Each of the positions is sufficiently separated from its adjacent positions to receive a different magnetization than that provided on the adjacent positions. For example, approximately 1,160 equally spaced pulse positions may be provided in each channel when the drum has a radius of approximately 4 inches.

A plurality of toroidal coils are positioned adjacent to each of the channels 18, 20, 22 and 24. Thus, coils 32, 34 and 36 are provided in contiguous relationship to the channel 18. Similarly, coils 38, 40 and 42, and coils 44, 46 and 48 are associated with the channels 20 and 22, respectively. A single coil 50 is disposed adjacent the channel 24.

The coils 32 and 34 are effectively separated from each other by approximately 104 pulse positions, and the coil 36 is disposed at an intermediate position between the coils 32 and 34. The coil 34 is adapted to provide signals in a pattern dependent upon the operation of the differential digital analyzer and to produce a corresponding magnetic pattern on the drum 10 as the drum rotates. The pattern produced on the drum 10 by the coil 34 is of the binary form in which a high level of magnetization indicates one value and a low level of magnetization indicates a second value. The coil 32 is adapted to pick up the changes in adjacent positions on the drum between the high and low levels of magnetization and to produce signals indicating the changes in magnetization. These signals may be amplified before they are utilized by the components associated with the coil 32.

The coil 36 is adapted to produce a substantially constant signal for returning the level of magnetization on the drum to the lower of the two values after the magnetic pattern on the drum has been converted into a corresponding electrical pattern by the coil 32.

Similarly, the coils 40 and 44 are adapted to provide a magnetic pattern in the channels 20 and 22, respectively, in a pattern dependent upon the operation of the apparatus shown in Figure 11 in solving a particular problem. The coils 38 and 46 are adapted to produce signals in accordance with the magnetic pattern provided in their respective channels by the coils 40 and 44. Although the coils 38 and 46 are shown as being connected directly to certain components, the signals from the coils may be amplified before being introduced to the components. The coils 42 and 48 are adapted to operate in a manner similar to the coil 36 to produce a constant and low level of magnetization in the channels 20 and 22, respectively, after the patterns provided by the coils 40 and 44 have been utilized by the coils 38 and 46, respectively. The coil 50 is adapted to produce a cycle of a signal approximating a sine wave as each pulse position in the channel 24 moves past the coil. The coil 50 produces a pattern of sine waves because of the magnetic pattern permanently provided in the channel 24. This pattern remains constant regardless of the problem to be solved.

The coils 38, 40 and 42 are effectively separated from one another by spacings similar to those provided between the coils 32, 34 and 36. For reasons which will be disclosed in detail hereafter, the coils 44 and 46 are effectively separated from each other by approximately 49 pulse positions during the operation of the analyzer to obtain the solution of a problem.

Gate circuits 52, 54 and 56 are connected between the coils 32 and 34, the coils 38 and 40, and the coils 44 and 46, respectively. The periods of time for the opening of the gate circuits 52, 54 and 56 are controlled by output signals from a counter 58. The construction and operation of the counter 58 are fully disclosed in co-pending application Serial No. 217,478 on pages 74 to 83, inclusive, of the specification and in Figures 17 to 23, inclusive, of the drawings. The coils 32 and 46 are also connected to the input terminal of a coincidence circuit 60 having its output terminal connected to the input terminal of a counter 62. The output from the counter 62 is in turn introduced to an input terminal of a stepping circuit 64. The construction and operation of the counter 62 and the stepping circuit 64 are fully disclosed in co-pending application Serial No. 217,478 on pages 90 to 98, inclusive, of the specification and in Figures 29 to 33, inclusive, of the drawings. A second input terminal of the circuit 64 is connected to the output terminal of a gate circuit 66 having its input terminals connected to the coil 32 and to an output terminal of the counter 58.

An input terminal of an adder 68 is connected to the output terminal of the stepping circuit 64, and other input terminals of the adder are connected to the coil 32 and to the output terminals of the gate circuit 66 and of a carry circuit 70. The construction and operation of the adder 68 are fully disclosed in co-pending application Serial No. 217,478 on pages 108 to 110, inclusive, of the specification and in Figures 38 and 39 of the drawings. Connections are made from the output terminal of the adder 68 to the input terminals of the carry circuit 70 and to the input terminal of a gate circuit 72, another input terminal of which is connected to the counter 58. The output from the gate circuit 72 is applied by the coil 34 as a magnetic pattern on appropriate pulse positions in the channel 18.

Just as the output signals from the coils 32 and 46 are applied to the coincidence circuit 60, output signals from the coils 38 and 46 are introduced to a coincidence circuit 74. The coincidence circuit 74 and the gate circuit 66 provide controls over the operation of an adder 76 similar to the adder 68. The construction and operation of the adder 76 are fully disclosed in co-pending application Serial No. 217,478 on pages 110 to 120, inclusive, of the specification and in Figures 41 to 46, inclusive, of the drawings. In accordance with the controls provided by the coincidence circuit 74 and the gate circuit 66, the adder 76 arithmetically combines pulses introduced to it from the coils 32 and 38 and from a carry circuit 78, as will be explained in detail hereafter. The adder 76 in turn introduces signals to the carry circuit 78 and to a pair of gate circuits 80 and 82, which also have control signals introduced to them from the counter 58. The output signals from the gate circuits 80 and 82 are applied to the coils 40 and 44, respectively.

As previously disclosed, the magnetic pattern in the channel 24 differs from the pattern in the other channels in that it is permanently recorded in its channel. The magnetic pattern in the channel 24 is in the form of a sine wave, with each cycle of the sine wave being disposed in a successive pulse position in the channel. The counter 58 is adapted to count the cycles of the sine waves in the channel 24 as the drum 10 rotates, since it is formed from a plurality of multivibrators connected in cascade arrangement. For example the counter 58 counts successive sine waves in a range from "1" to "48" and upon each count of "48" returns to its original state to initiate a new count.

Similarly, a counter 84 is formed from a plurality of multivibrators in cascade arrangement and is associated with the counter 58 to count the number of times that a full count is obtained in the counter 58. For example, the counter 84 may count up to 22 full counts in the counter 58 before returning to a count of "1" for the initiation of a new count. In this way, the counters 58 and 84 divide the drum 10 into 22 integrator storage sections, each providing the storage capacity for an integrator and each having 48 pulse positions.

The digital differential analyzer disclosed above is adapted to provide the solution of differential equations. For example, it may provide the solution for a general equation $y=f(x)$ so as to obtain a function $$\int y dx = \int f(x) dx$$

where $f(x)$ represents a function of $x$ and $\int f(x)dx$ represents the integral of the function. If a curve $y=f(x)$ is plotted with $x$ as the abscissa and $y$ as the ordinate, the analyzer obtains the relationship $\int y dx=\int f(x)dx$ by computing the area under the curve $y=f(x)$. By determining the area under the curve $y=f(x)$, the analyzer performs electronically operations that may sometimes be performed mentally by a skilled mathematician when the problem to be solved is relatively simple.

Figure 13:
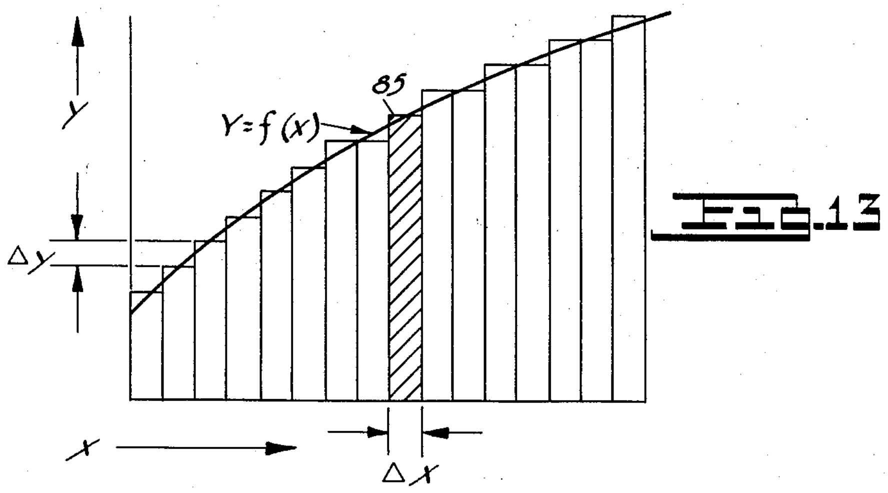
Figure 13 is a curve illustrating the operation of the integrator shown in Figure 12.

The analyzer obtains the value of the function $$\int y dx = \int f(x) dx$$

by producing small increments of $x$. These increments may be represented by the symbol $\Delta x$. For each $\Delta x$ increment, the analyzer determines the value of $y$ and obtains the product $y\Delta x$. This product $y\Delta x$ represents the area under the curve $y=f(x)$ for each $\Delta x$ increment, as indicated in Figure 13 by the shaded area 85 for a particular $\Delta x$ increment. If the product $y\Delta x$ is obtained for successive $\Delta x$ increments and if all of the $y\Delta x$ increments are added together, the area under the interval of the curve representing $f(x)$ from $x_0$ to $x$ may be approximated. The approximation may be as close to the actual value as desired by decreasing the value of each $\Delta x$ increment.

Figure 12:
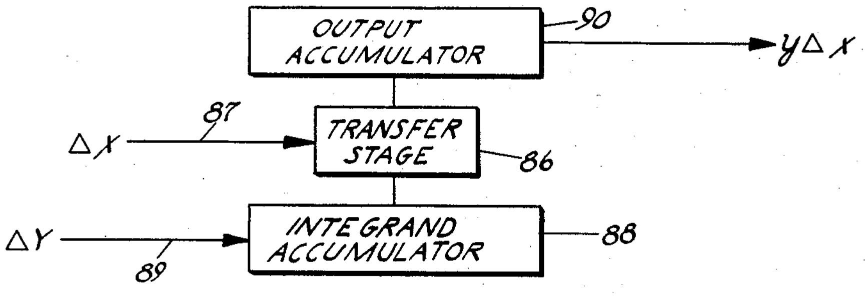
Figure 12 is a block diagram illustrating the operation of one of the integrators forming a part of the digital differential analyzer shown in Figure 11.

An integrator for determining the $y\Delta x$ increments and for storing the cumulative values of these increments is shown in Figure 12. The integrator includes a transfer stage 86 for obtaining $\Delta x$ increments at periodic intervals through a line 87. The integrator also has an integrand accumulator 88 for storing the value of the dependent quantity $y$ and for receiving $\Delta y$ increments through a line 89 from its own and from other integrators so as to vary the value of $y$ in accordance with the function $y=f(x)$. An output accumulator 90 is provided to receive $y\Delta x$ increments, to combine each $y\Delta x$ increment with the previous increments and to store the cumulative value obtained. As will be explained in detail hereafter, the output from the accumulator 90 may be introduced to the integrand accumulator 88 of its own and of other integrators to produce the $\Delta y$ increments for these accumulators.

Figure 15:
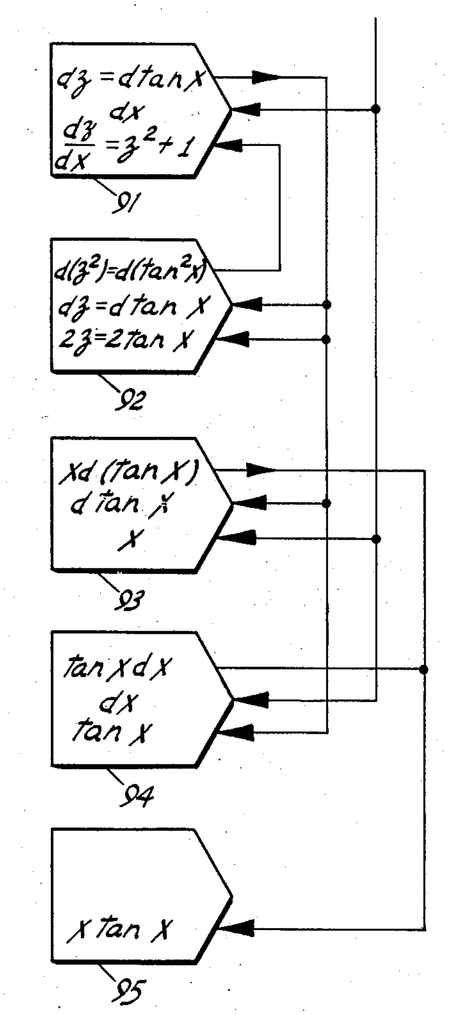
Figure 15 is a schematic diagram illustrating the relationship between different integrators forming the digital differential analyzer shown in Figure 11 when the analyzer is solving a particular problem.

The interrelationship between different integrators is illustrated in Figure 15 for a particular problem represented by $$\frac{d^2y}{dx^2}=y^2+1$$

As is mathematically known, the differential solution of this problem indicates that $y=x \tan x$. The integrators involved in the solution of this problem are indicated in Figure 15 by blocks 91, 92, 93, 94 and 95. In each integrator, the introduction of the $\Delta x$ increments constituting the independent variable for the integrator is indicated by a line extending into an intermediate position in the block at the right side of the block. The $\Delta y$ increments are introduced into the integrator through a line or a plurality of lines extending into the lower right portion of the block representing the integrator. The output of the integrator is obtained from a line extending from an upper position at the right side of the appropriate block.

As will be seen in Figure 15, $\Delta x$ increments of the independent variable for a particular integrator may be obtained from the output of another integrator. For example, in Figure 15, the $\Delta x$ increments for the integrators 92 and 93 are obtained from the output of the integrator 91. Similarly, $\Delta y$ increments for a particular integrator may be obtained from the output of other integrators as well as from the output of the integrator itself. For example, $\Delta y$ increments for the integrators 92 and 94 are obtained from the output of the integrator 91.

Figure 14:
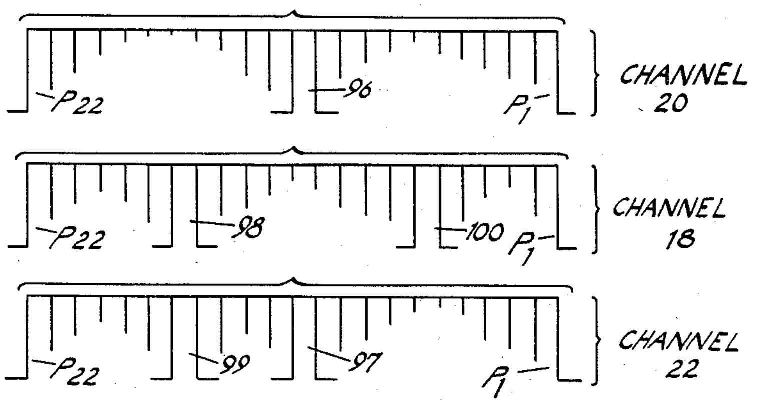
Figure 14 is a chart which illustrates how different parts of an integrator such as that shown in Figure 12 are coded to control the operation of the integrator.

The $\Delta x$ and $\Delta y$ increments for each integrator are actually determined from a coded pattern provided in the channels 20 and 18, respectively. As previously disclosed, the pulse positions in each channel are subdivided into 22 integrator storage sections, each having 48 pulse positions. The first 22 positions in each integrator storage section in the channel 20 are coded to indicate a $\Delta x$ increment. Since the first 22 positions in the channel 20 for each integrator correspond in number to the 22 integrators in the analyzer, the pulse representing $\Delta x$ for each integrator is recorded in a particular position in the channel 20. This position corresponds to the particular integrator from which the $\Delta x$ increments are obtained. For example, the $\Delta x$ increments for the integrator 92 in Figure 15 would be coded in a particular one of the 22 positions in the channel 20 corresponding to the time at which the output from the integrator 91 appears on the coil 46. In Figure 14, a pulse 96 is shown as being recorded in the channel 20 in the 11th pulse position for a particular integrator.

A pulse in the channel 20 in one of the first 22 positions for a particular integrator indicates that a $\Delta x$ increment is to be made, but it does not indicate whether the increment is positive or negative. The sign of the increment is indicated by the presence or absence of a coincidental pulse in the channel 22. If a pulse is picked up from the channel 22 by the coil 44 at the same time as the pulse indicative of $\Delta x$ for a particular integrator is picked up by the coil 38, the $\Delta x$ increment for the integrator is positive. For example, the pulse 96 in Figure 14 indicates a positive $\Delta x$ increment since it coincides in time with a pulse 97 in the channel 22. The $\Delta x$ increment is negative if a pulse does not appear in the channel 22 at the same time as the pulse in the channel 20.

In like manner, $\Delta y$ increments for a particular integrator are represented by pulses appearing in the channel 18 in the first 22 positions for the integrator. Each pulse represents a $\Delta y$ increment but does not indicate the sign of the increment. The sign of the increment is indicated by the presence or absence of a pulse in the channel 22 at the time that the pulse in the channel 18 is made available to the coil 32. For example, a pulse 98 in Figure 14 indicates a positive $\Delta y$ increment for a particular integrator since it coincides in time with a pulse 99 in the channel 22. However, a pulse 100 indicates a negative $\Delta y$ increment since there is no coincidental pulse in the channel 22.

The first 22 positions in the channel 18 for each integrator correspond to the 22 integrators in the digital differential analyzer. Because of this, each integrator is coded in particular ones of the first 22 positions in the channel 18 so as to receive the outputs from certain other integrators in accordance with the problem to be solved. For example, a pulse would be coded in the channel 18 in a particular one of the first 22 positions for the integrator 93 in Figure 15 so as to coincide with the time at which the output from the integrator 91 is made available to the coil 46 in the channel 22. Although only one $\Delta x$ increment can be obtained for an integrator upon each revolution of the drum, several $\Delta y$ increments can be obtained. This may be seen by the pulses 98 and 100 in the channel 18 in Figure 14.

Since the interrelationship between the different integrators remains constant during the solution of a particular problem, the coding pulses in the channels 18 and 20 for the first 22 positions of each integrator must be retained during the computation. Retention of the pulses in the channel 18 is provided by the gate circuit 52. This gate circuit is opened by a signal from the counter 58 when the first pulse in each integrator is picked up by the coil 32, and it remains open so that subsequent information up to and including the 22nd pulse position for the integrator can pass to the record coil 34. Similarly, the gate circuit 54 opens upon the occurrence of the first pulse in the channel 20 for each integrator and remains open until after the 22nd pulse position for the integrator for the passage of the coded information to the record coil 40.

Since a plurality of $\Delta y$ increments may be obtained for each integrator every time that the integrator is made available for computation, members are provided in the analyzer to determine the resultant value of the increments. For example, if 4 positive $\Delta y$ increments and 1 negative $\Delta y$ increment are all obtained for an integrator when the integrator storage section is made available at a particular time for computation, the resultant $\Delta y$ increment for the integrator would be +3. The resultant value of $\Delta y$ for each integrator during every computation is obtained by the coincidence circuit 60 and the counter 62.

The circuit 60 determines the sign of each $\Delta y$ increment by noting whether or not a pulse is picked up in the channel 22 by the coil 46 at the same time that a coding pulse is picked up in the channel 18 by the coil 32. The counter 62 counts the positive and negative $\Delta y$ increments for each integrator to obtain the resultant value of $\Delta y$. The counter 62 includes a plurality of multivibrators connected in cascade arrangement to indicate in binary form the resultant value of $\Delta y$ for each integrator. For example, with a resultant count of +5 for $\Delta y$, the first and third multivibrators in the cascade arrangement may be operated to indicate a binary pattern of 101, where the least significant digit is at the right. In binary form, a pattern of 101 indicates that $(1)(2^2)+(0)(2^1)+(1)(2^0)=(5)$.

The resultant value of $\Delta y$ stored in the counter 62 for each integrator is made available on a step-by-step basis by the circuit 64, which feeds the information sequentially into the adder 68. For example, when the resultant value of $\Delta y$ for a particular integrator is +5, the circuit 64 indicates a value of +1 upon the rotation of the drum 10 past the pulse position which indicates the least significant digit of the number. This corresponds to the value of the least significant digit in the binary indication of +5. As the drum rotates past second and third pulse positions, the circuit 64 indicates values of 0 and 1, respectively.

The stepping circuit 64 operates to pass in sequence the binary indications in the counter 62 only after it has been triggered by a pulse passing through the gate circuit 66. The gate circuit 66 is so connected to the counter 58 that it cannot open for the passage of a triggering signal until after the 22nd pulse position in the channel 18 for each integrator. When the first pulse appears in the channel 18 for an integrator after the initial 22 pulse positions for the integrator, the gate circuit 66 is opened for the passage of a triggering signal.

The signal passing through the gate circuit 66 not only triggers the circuit 64 into operation but also triggers the adder 68. The adder 68 then receives binary indications of the value of $y$ for each integrator and arithmetically combines these indications with the values of $\Delta y$ passing through the circuit 64. The arithmetical combination of the values of $y$ and $\Delta y$ are obtained for each pulse position in sequence as the drum rotates. For example, the arithmetical combinations of the indications of $y$ and $\Delta y$ in the 25th pulse position for a particular integrator may be first obtained. The arithmetical combination of the values of $y$ and $\Delta y$ may thereafter be sequentially obtained for the 26th, 27th and the following pulse positions for the integrator.

Sometimes, upon the arithmetical combination of the values of $y$ and $\Delta y$ for a particular pulse position, the adder 68 may obtain a full binary indication of +2. In binary form, an indication of +2 is equivalent to a value of 0 for the pulse position and a carry of +1 to the next highest binary digit. For example, if a binary indication of +1 for $y$ in the 26th position is added to a binary indication of +1 for $\Delta y$ in the same position, the resultant value may be 0 in the 26th position with a carry of +1 into the 27th position. This carry is provided by the circuit 70.

By arithmetically combining the values of $y$ and $\Delta y$ and the carry indications for each pulse position, a new value of $y$ is obtained. The new indication of $y$ for each pulse position passes sequentially through the gate circuit 72 and produces a corresponding signal pattern in the coil 34. This signal pattern causes the coil 34 to record in the channel 18 the new value of $y$ for each pulse position. The information relating to the new value of $y$ is subsequently utilized by the adder 68 as it moves past the coil 32, and it is thereafter erased by the coil 36.

In addition to controlling the operation of the adder 68, the gate circuit 66 also controls the operation of the adder 76. Because of the control exerted by the gate circuit 66, the adder 76 is able to operate only in the pulse positions indicating the numerical value of $y\Delta x$ for each integrator and not in the first 22 positions for each integrator. The adder 76 arithmetically combines each incremental value of $y\Delta x$ for a particular integrator to the incremental values of $y\Delta x$ previously obtained for that integrator. As will be disclosed hereinafter, the incremental values of $y\Delta x$ previously obtained for that integrator are represented by information in the channels 20 and 22.

The addition or subtraction of each $y\Delta x$ increment for a particular integrator to or from the $y\Delta x$ increments previously obtained for the integrator is determined by the sign of $y$ as well as the sign of $\Delta x$. The sign of $y$ for a particular integrator is determined by the presence or absence of a pulse in the 47th pulse position in the channel 18 for that integrator. When the value of $y$ is positive, a pulse is provided in the 47th position. However, no pulse is provided in the 47th position in the channel 18 for a particular integrator when the value of $y$ for that integrator is negative.

As previously disclosed, the value of $\Delta x$ is determined by the coincidence between a pulse in the first 22 positions in the channel 20 for a particular integrator and a pulse in the channel 22. This determination is made by the coincidence circuit 74. The coincidence circuit 74 indicates that the value of $\Delta x$ is positive for a particular integrator when the coil 46 picks up a pulse in the channel 22 at the same time that the coil 38 picks up a coding pulse for the integrator in the channel 20. When no pulse appears in the channel 22 at the same time as the appearance of the coding pulse in the channel 20, the coincidence circuit 74 indicates that $\Delta x$ is negative.

Upon an indication by the coincidence circuit 74 that the sign of $\Delta x$ is positive, the circuit makes no change in the indications provided for the value of $y$. However, for negative indications of $\Delta x$ for a particular integrator, the circuit 74 changes the value of $y$ into its complementary form. For example, when the value of $y$ for a particular integrator is positive, the circuit 74 changes this value into a corresponding negative value upon an indication by the circuit that the sign of $\Delta x$ is negative. A complementary change in the value of $y$ is equivalent to transferring the negative sign from $\Delta x$ to $y$, since $(y)(-\Delta x)=(-y)(\Delta x)$.

A change in the value of the dependent quantity $y$ from a positive to a negative value is accomplished by reversing the indication of $y$ in each pulse position and by adding a value of 1 to the least significant position indicating the $y$ value. For example, an indication of 101 representing a value of +5 is converted into an indication of 011 representing a value of −5 by reversing the indication 101 into an indication 010 and by adding a one to the least significant digit. As previously disclosed, the least significant digit in the above example is at the extreme right, and the significance of the digit advances with digital movements to the left. The sign of the dependent quantity $y$ is also changed by converting the indication of 1 in the 47th position into an indication of 0. Although an indication of 011 represents a negative value of −5 when no pulse appears in the 47th position, it would also represent a positive value of +3 when a pulse appears in the 47th position.

Since 5 is the octal complement of 3, it may be seen from the above example and from other examples that the conversion of a positive number into a negative number is obtained by producing the octal complement of the number and by changing in the 47th position the indication of the sign. Because of the fact that subtracting 5 from a number is equivalent to adding 3 in the octal system, it will be seen that the conversion of a positive number into its complementary negative value provides the correct result when the number is arithmetically combined with the number in the channel 20.

Just as the adder 68 combines the indications of $y$ and $\Delta y$ for each pulse position on a sequential basis, the adder 76 combines the indications of a particular $y\Delta x$ increment with the sum of the previous $y\Delta x$ increments on a sequential basis. In this way, a new indication is obtained of the sum of the integrated value of $y\Delta x$ for all increments of this function, including the increment being presented for computation. The new indication of the integrated value of $y\Delta x$ passes through the gate circuit 80, which opens after the 22nd pulse position for each integrator as a result of signals from the counter 58. The new indications of $y\Delta x$ pass to the coil 40 for recordation in the channel 20.

It may sometimes happen that a full indication is provided in the channel 20 to indicate the cumulative values of $y\Delta x$ for a particular integrator. For example, for a positive value of $y\Delta x$ for a particular integrator, such a full indication is provided by a pulse in each of the pulse positions representing the value of $y\Delta x$. If a positive increment of $y\Delta x$ for the particular integrator is subsequently added to the indication already in the channel 20 for the integrator, an overflow is obtained. This overflow causes the indications in the channel 20 for the particular integrator to return to a relatively low value for the initiation of a new count. For example, if a positive number such as 596 is indicated in binary form in the channel 20 for a particular integrator and if the maximum indication that can be provided is 600, the addition of a value of +10 causes the indication in the channel 20 to return to a value of +6. At the same time the adder 76 produces a pulse at the 48th position for the particular integrator.

The pulse produced by the adder 76 at the 48th position for each integrator passes through the gate circuit 82 for recordation by the coil 44 in the channel 22. The gate circuit 82 is opened by the counter 58 at the 48th pulse position for each integrator because of the particular connections made from the counter to the gate circuit. In like manner, the coil 44 provides a recordation in the channel 22 of any overflow in the channel 20 for each of the 22 integrators in the analyzer.

Just as a positive pulse from the adder 76 at the 48th position for a particular integrator indicates a positive overflow of the value of $y\Delta x$ available for storage in the channel 20, a lack of a pulse from the adder 76 at this position indicates a negative overflow. The production of no pulse at the 48th position for the integrator indicates a negative overflow since a negative number is indicated by complementing the combination of the pulses and lack of pulses which indicate a corresponding positive number. For example, by such a complementation, a positive number indicated by a pulse in each available pulse position is indicated as a negative number of corresponding magnitude by the lack of a pulse in each position, except for the position indicating the least significant binary digit.

As previously disclosed, the coils 44 and 46 are effectively separated from each other by 49 pulse positions. Since the length of each integrator is only 48 positions, a precessing action occurs in the channel 22. This precessing action causes a pulse position to be made available in the channel 22 so that the overflow information for $y\Delta x$ in the 48th pulse position for each integrator can be recorded after the computation has been made for the integrator. This may be seen in the chart shown in Figure 16.

Figure 16:
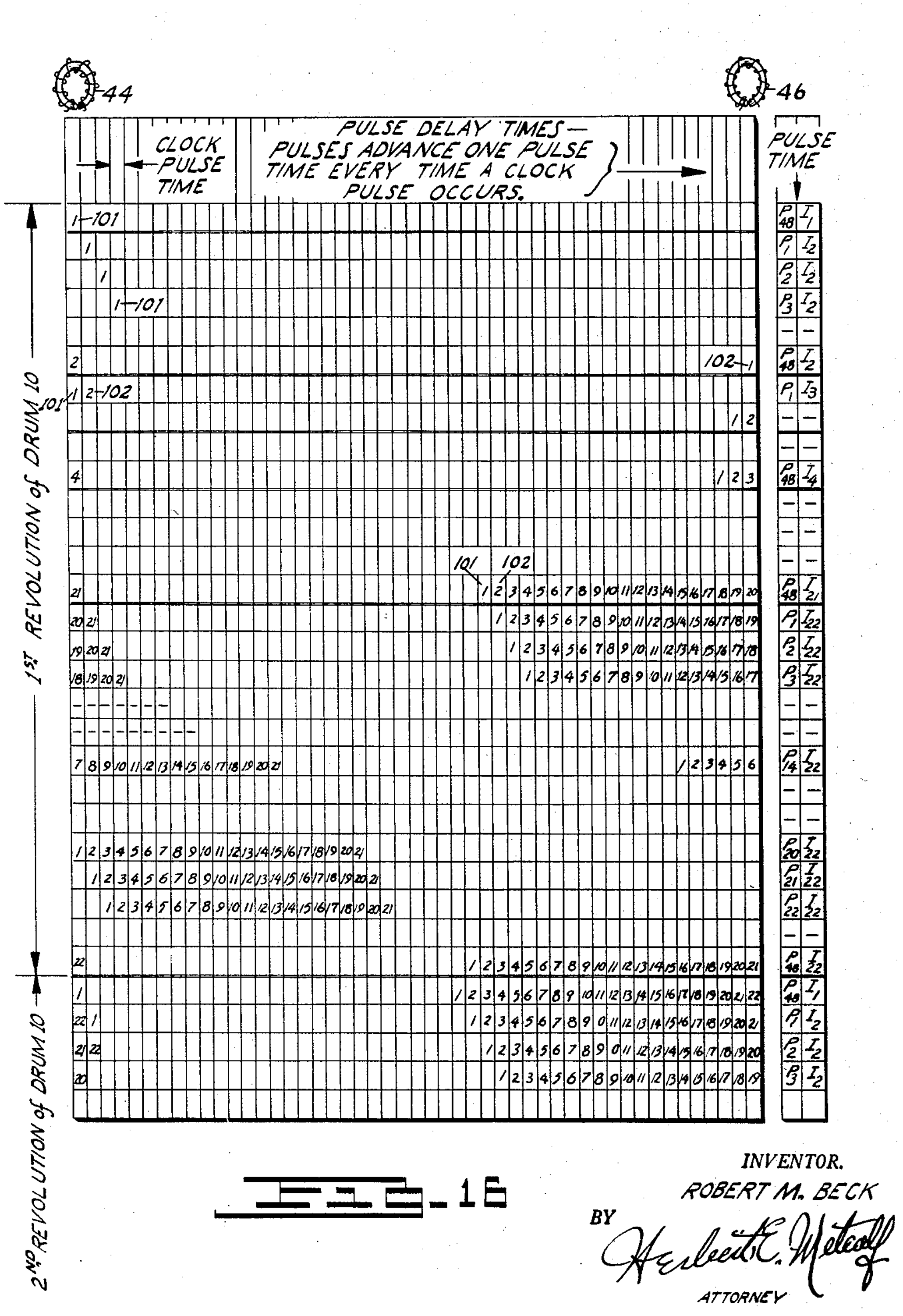
Figure 16 is a chart illustrating the operation of certain of the components shown in Figure 11.

In all of the vertical columns in the chart shown in Figure 16 except for the two at the extreme right, numbers between "1" and "22" are shown corresponding to the 22 integrators in the digital differential analyzer. In the two vertical columns at the extreme right, numbers are shown prefaced by the letters "I" and "P." The letter "I" followed by a number indicates the particular integrator that is moving past the coil 44 at any instant. For example, "I3" indicates that a pulse position in the 3rd integrator is moving past the coil 44. Similarly, a designation such as "P13" indicates that the 13th pulse position in the particular integrator is moving past the coil 44.

As will be seen at 101 in Figure 16, a first indication is provided at the 48th position of Integrator "1." This indication advances from the coil 44 towards the coil 46 as the drum 10 rotates through the 48 positions of Integrator "2." At the 48th position of Integrator "2," an indication is recorded by the coil 44 to indicate any overflow from Integrator "2," as shown at 102 in Figure 16. At the $P_1I_3$ position, the indication 101 passes through the gate circuit 56 to the coil 44 and is again recorded in the channel 22, this time at the pulse position adjacent to the indication 102.

Similarly, indications are provided in adjacent pulse positions to show whether or not an overflow has occurred in the cumulative value of $y\Delta x$ for each of the other integrators in the analyzer. These indications are recirculated by the gate circuit 56 which remains open during the first 47 positions of each integrator. At the 48th pulse position for each integrator, the gate circuit 56 closes and prevents any recirculation of old information. At the same time as the gate circuit 56 closes, the overflow indication for the integrator moving past the coil 44 is recorded in the channel 22.

After the indications have been provided in the channel 22 for the 48th pulse position of each integrator, Integrator "1" becomes available for computation a second time. As the drum rotates through the first 22 positions for the integrator, the output indications for the 22 integrators move in sequence past the coil 46. This causes the output indications to become available for determining the sign of the increment of $\Delta x$ and of each increment of $\Delta y$ for the integrator during the second computation. The determination of sign for the increment of $\Delta x$ and for each increment of $\Delta y$ is made in a manner similar to that disclosed above. In like manner, the output from the 48th position of the 22 integrators is made available to each integrator as it is presented for computation.

The digital differential analyzer shown in Figure 11 has been disclosed only in sufficient detail to provide an understanding of the system which is shown in Figures 1 to 8, inclusive, and which forms one embodiment of this invention. A full disclosure of the digital differential analyzer shown in Figure 11 is provided in co-pending application Serial No. 217,478 filed March 26, 1951, by Floyd G. Steele and William F. Collison.

The system shown in Figures 1 to 8, inclusive, is adapted to operate in conjunction with the digital differential analyzer disclosed above to automatically code the analyzer in accordance with a differential problem to be solved. In addition to the drum 10 and the coils associated with the drum, the system includes a coil 102 (Figure 1) effectively separated from the coil 44 by substantially 1054 pulse positions. The coil 102 operates to produce signals in accordance with the magnetic pattern in the channel 22 and in a manner similar to the coil 46. The signals from the coil 102 may be amplified before they are utilized by the components associated with the coil.

Figure 1:
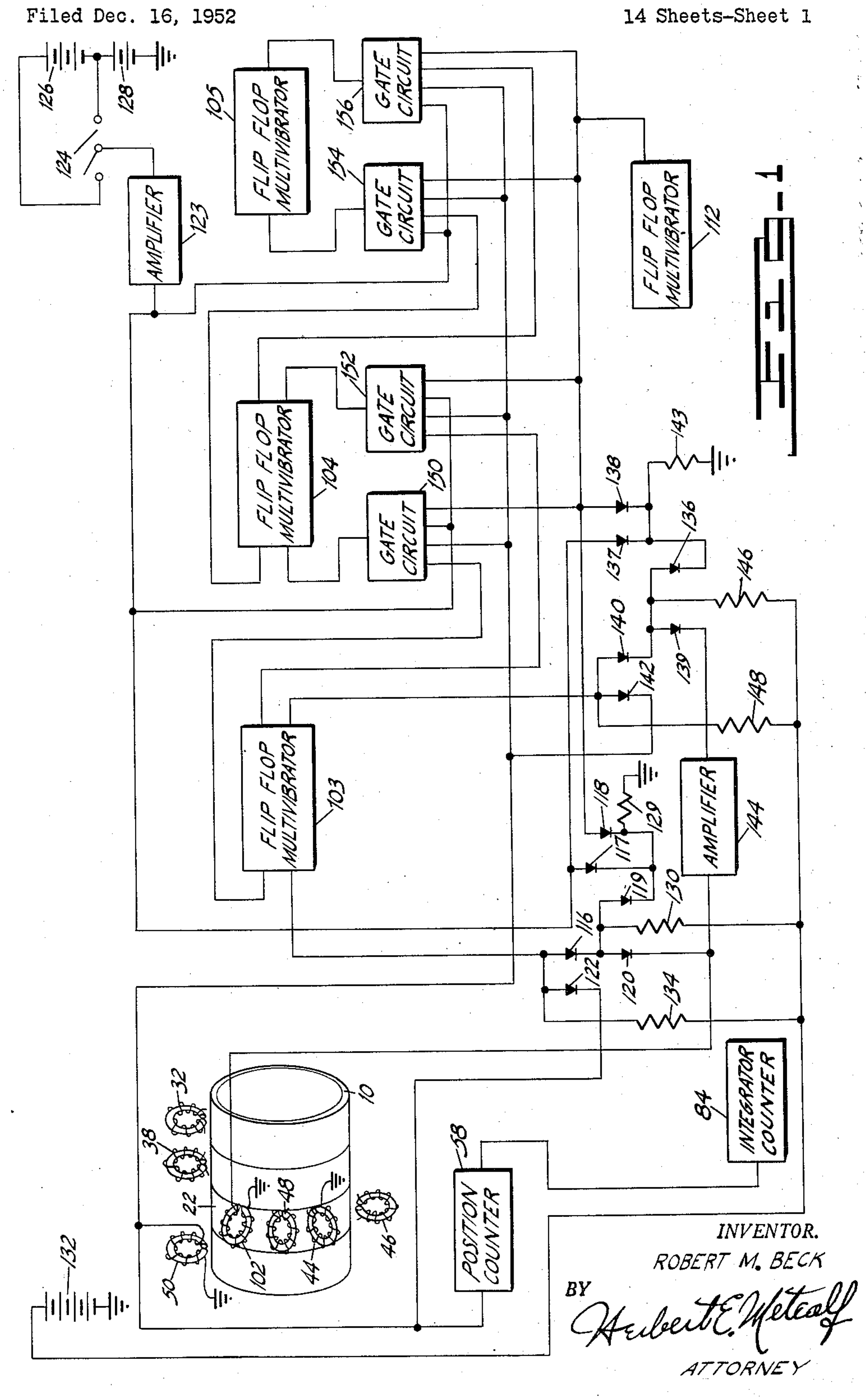
Figures 1, 2, 3, 4, 5 and 6 are circuit diagrams, partly in block form and partly in perspective, showing the various electrical features which together constitute one embodiment of the invention, some of the components being shown as duplicates in more than one view.
Figure 2:
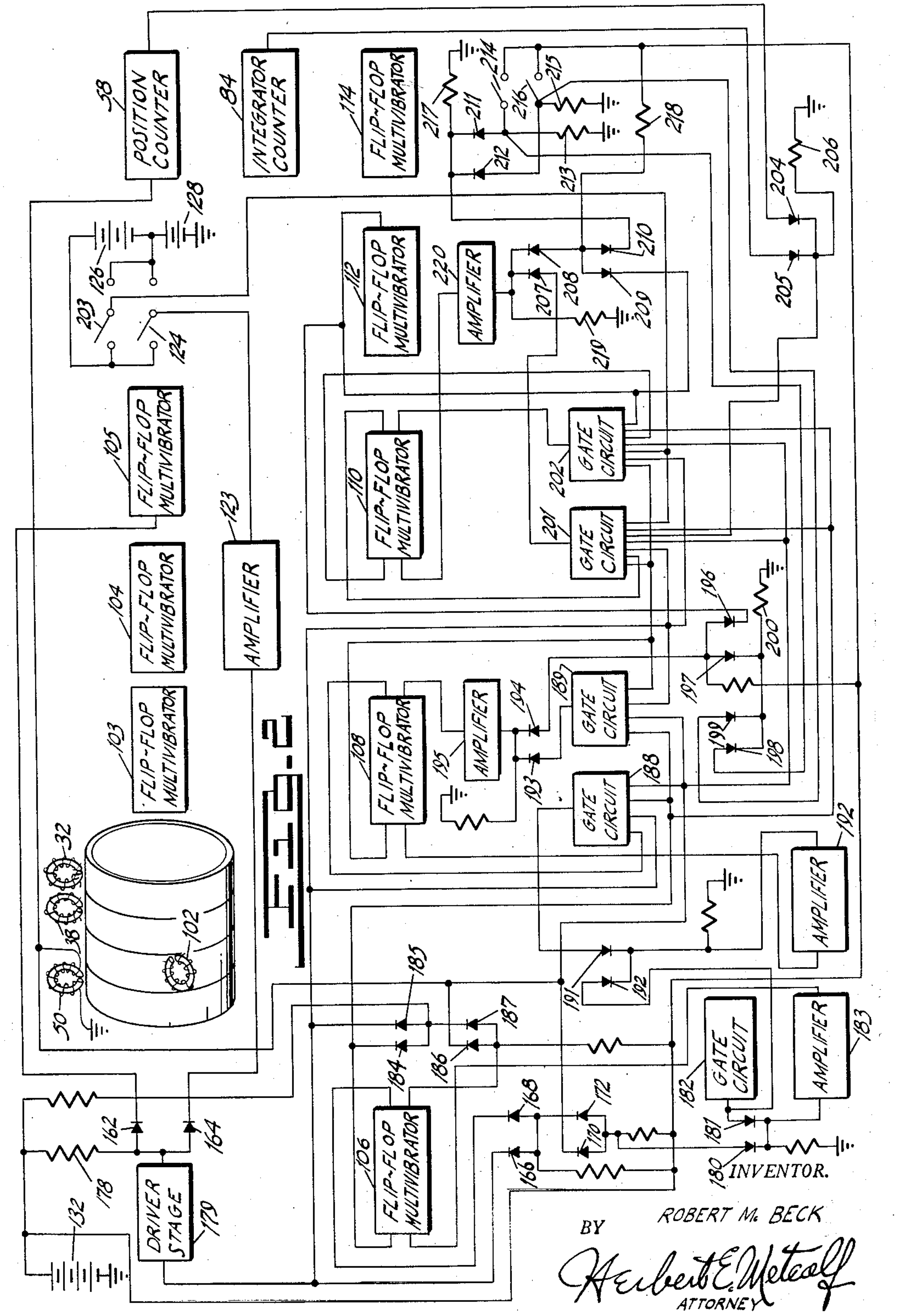

A plurality of multivibrators 103, 104 and 105 shown in Figure 1 and a plurality of multivibrators 106, 108, 110, 112 and 114 shown in Figure 2 are associated with the coil 102. The grid of the left tube in the multivibrator 103, is connected to the plate of a crystal diode 116 (Figure 1) which forms a network with crystal diodes 117, 118, 119, 120 and 122. The plate of the diode 117 is connected to the output terminal of an amplifier 123, the input terminal of which is connected to the movable contact of a manually operated, single-pole, double-throw switch 124. The switch 124 performs certain functions similar to those performed by the ganged switches 356 and 357 shown in Figure 50 of co-pending application Serial No. 217,478 and to the switch immediately above the switch 356 in Figure 50 of the co-pending application. One stationary contact of the switch 124 is connected to the positive terminal of a suitable power supply, such as a battery 126, and the other stationary terminal is connected to the negative terminal of the battery 126. The battery 126 is in series with a suitable power supply, such as a battery 128, the negative terminal of which is grounded.

The cathode of the diode 117 is connected to the cathode of the diode 118, the plate of which is connected to the plate of the right tube in the multivibrator 112. The cathode of the diode 117 also has a common terminal with a grounded resistance 129 and with the cathode of the diode 119.

The cathode of the diode 120 is connected to the coil 102 in the channel 22 and the cathode of the diode 122 is connected to the coil 50. The plates of the diodes 119 and 120 are connected to the cathode of the diode 116 and through a resistance 130 to the positive terminal of a suitable power supply such as a battery 132, the negative terminal of which is grounded. In like manner, the plates of the diodes 116 and 122 are connected through a suitable resistance 134 to the positive terminal of the battery 132.

Just as the grid of the left tube in the multivibrator 103 is associated with a diode network, the grid of the right tube in the multivibrator is associated with a network including crystal diodes 136, 137, 138, 139, 140 and 142. The plates of the diodes 137 and 138 are respectively connected to the output terminal of the amplifier 123 and to the plate of the right tube in the multivibrator 112. The cathodes of the diodes 137 and 138 are connected to a grounded resistance 143 and to the cathode of the diode 136.

The cathode of the diode 139 is connected through an amplifier 144 to the coil 102. The plates of the diodes 136 and 139 are connected through a suitable resistance 146 to the positive terminal of the battery 132 and to the cathode of the diode 140. Connections are made from the plate of the diode 140 to the grid of the right tube in the multivibrator 103, to the plate of the diode 142 and through a suitable resistance 148 to the positive terminal of the battery 132. The cathode of the diode 142 is connected to the coil 50.

The voltage on the plate of the left tube in the multivibrator 103 is introduced to an input terminal of a gate circuit 150 having other input terminals connected to the coil 50, to the output terminal of the amplifier 123 and to the plate of the right tube in the multivibrator 112. The gate circuit 150 may be formed from a diode network similar to the diodes 116, 117, 118, 119, 120 and 122. The output terminal of the gate circuit 150 is connected to the grid of the left tube in the multivibrator 104.

Similarly, input terminals of the gate circuit 152 have voltages applied to them from the coil 50, the output terminal of the amplifier 123 and the plates of the right tubes in the multivibrators 103 and 112. The output voltage from the gate circuit 152 is in turn applied to the grid of the right tube in the multivibrator 104.

Gate circuits 154 and 156 similar to the gate circuits 150 and 152, respectively, are associated with the left and right tubes in the multivibrator 105. Each of the gate circuits 154 and 156, respectively, are associated with the left and right tubes in the multivibrator 105. Each of the gate circuits has input terminals connected to the coil 50, the output terminal of the amplifier 123 and the plate of the right tube in the multivibrator 112. In addition, connections are respectively made to input terminals of the gate circuits 154 and 156 from the plates of the left and right tubes in the multivibrator 104.

It should be appreciated that the networks associated with the multivibrators 103, 104 and 105 in Figure 1 are included to control the operation of the coil 102 during the periods that the digital differential analyzer shown in Figure 11 is being coded by the system shown in Figures 1 to 8, inclusive. Because of these networks and because of networks associated with the coil 46, the coil does not operate during the coding operation. As previously disclosed, the coil 46 operates during the actual computing operation, but the coil 102 becomes inoperative during this period.

The flip-flop multivibrators 106, 108, 110, 112 and 114 (Figure 2) are also connected to networks formed by pluralities of crystal diodes. For example, the grid of the left tube in the multivibrator 106 is associated with a network including diodes 162, 164, 166, 170 and 172, as shown in Figure 2. Connections are respectively made to the cathodes of the diodes 162 and 164 from the plate of the left tube in the multivibrator 105 and from the output terminal of the amplifier 123. The plates of the diodes 162 and 164 are connected through a suitable resistance 178 to the positive terminal of the battery 132 and to an input terminal of a driver stage 179, such as a cathode follower stage.

The voltage on the output terminal of the driver stage 179 is applied to the cathode of the diode 166, and the voltage on the plate of the right tube of the multivibrator 106 is applied to the cathode of the diode 168. Connections are made from the plates of the diodes 166 and 168 to the cathode of the diode 172 and through a suitable resistance to the positive terminal of the battery 132. The plate of the diode 172 is connected to the plate of the diode 170, the cathode of which is connected to the coil 50. The plate of the diode 172 is also connected to the plate of a diode 180 and through a suitable resistance to the positive terminal of the battery 132.

The cathode of the diode 180 is connected to a grounded resistance and to the cathode of a diode 181 having its plate connected to the output terminal of a gate circuit 182 which will be disclosed in detail hereinafter. The cathodes of the diodes 180 and 181 are also connected to the input terminal of an amplifier 183, the output terminal of which is connected to the grid of the left tube in the multivibrator 106.

Similarly, the grid of the right tube in the multivibrator 106 is associated with a network including diodes 184, 185, 186 and 187. The voltage on the plate of the left tube in the multivibrator 106 is applied to the cathode of the diode 184, and the voltage on the output terminal of the driver stage 179 is introduced to the cathode of the diode 185. The plates of the diodes 184 and 185 are connected to the cathode of the diode 187 and through a suitable resistance to the positive terminal of the battery 132. Connections are made from the plate of the diode 187 to a resistance in series with the battery 132, to the grid of the right tube in the multivibrator 106 and to the plate of the diode 186. The cathode of the diode 186 is connected to the coil 50.

Just as the operation of the left and right tubes in the multivibrator 106 is controlled by diode networks, the operation of the left and right tubes in the multivibrator 108 is also controlled by diode networks. These networks are represented by gate circuits 188 and 189. The gate circuit 188 is similar to the network formed by the diodes 166, 168, 170 and 172 in that it receives voltages from the coil 50 and the driver stage 179. In addition, the gate circuit 188 has input terminals connected to the plate of the left tube in the multivibrator 106 and the plate of the right tube in the multivibrator 108.

The output from the gate circuit 188 is applied to the plate of a diode 191 having its cathode connected to a grounded resistance and to the cathode of a diode 192, the plate of which is connected to the output terminal of the gate circuit 182. The cathodes of the diodes 191 and 192 are also connected to the input terminal of an amplifier 192 having its output terminal connected to the grid of the left tube in the multivibrator 108.

The gate circuit 189 is similar to the gate circuit 188 except that it has an input terminal connected to the plate of the left tube in the multivibrator 108 instead of the plate of the right tube in the multivibrator. The output from the gate circuit 189 is applied to the plate of a diode 193, the cathode of which is connected to a grounded resistance, to the cathode of a diode 194 and to the input terminal of an amplifier 195. The output from the amplifier 195 is applied to the grid of the right tube in the multivibrator 108.

The plate of the diode 194 has a common terminal with the plates of a pair of diodes 196 and 197 and with a suitable resistance in series with the battery 132. Connections are made from the cathode of the diode 196 to the plate of the right tube in the multivibrator 112 and from the cathode of the diode 197 to the cathodes of diodes 198 and 199 and to a grounded resistance 200. The plates of the diodes 198 and 199 respectively have voltages applied to them from the movable contacts of manually operated, single-pole, single-throw switches 214 and 216. The switches 214 and 216 correspond in function to the switches 349 and 350, respectively, shown in Figure 49 of co-pending application Serial No. 217,478.

Gate circuits 201 and 202, respectively, provide controls over the voltages on the grids of the left and right tubes in the multivibrator 110. The gate circuit 201 has input terminals connected to the coil 50, to the driver stage 179, to the plates of the left tubes in the multivibrators 106 and 108 and to the plate of the right tube in the multivibrator 110. Another input terminal of the gate circuit 201 is connected to the movable contact of a manually operated, single-pole, double-throw switch 203 having its stationary contacts connected to the positive and negative terminals of the battery 126. The switch 203 serves in effect as the master switch for controlling the automatic insertion of coding information into the digital differential analyzer.

The gate circuit 201 also has an input terminal connected to the cathodes of diodes 204 and 205 and to a grounded resistance 206. The plates of the diodes 204 and 205 respectively have voltages applied to them from counters 58 and 84 for reasons which will be disclosed in detail hereinafter. The output from the gate circuit 201 is applied to the plate of a diode 207 which is associated with diodes 208, 209, 210, 211 and 212. The plate of the diode 211 has a common terminal with a resistance 213 and with the movable contact of the switch 214, the stationary contact of which is connected to the positive terminal of the battery 132. Similarly, the plate of the diode 212 is connected to a grounded resistance 215 and to the movable contact of the switch 216, the stationary contact of which is connected to the positive terminal of the battery 132.

Connections are made from the cathodes of the diodes 211 and 212 to a grounded resistance 217 and to the cathode of the diode 210. The diode 210 forms a network with the diode 209, the cathode of which is connected to the plate of the right tube in the multivibrator 112. The plates of the diodes 209 and 210 have a common terminal with the plate of the diode 208 and with a resistance 218 in series with the battery 132. The cathodes of the diodes 207 and 208 are connected to a grounded resistance 219 and to the input terminal of an amplifier 220. The output from the amplifier 220 is applied to the grid of the left tube in the multivibrator 110.

Connections are made to input terminals of the gate circuit 202 from the driver stage 179, the coil 50, and the plates of the left tubes in the multivibrators 106, 108 and 110. A connection is also made to an input terminal of the gate circuit 202 from the plate of the right tube in the multivibrator 112.

Similarly, gate circuits 226 (Figure 3) and 228 control the voltages introduced to the grids of the left and right tubes, respectively, in the multivibrator 112. The gate circuit 226 has input terminals connected to the coil 102, the coil 50 and the output terminal of the amplifier 123. Other input terminals of the gate circuit 226 have voltages applied to them from the plates of the left tubes in the multivibrators 108 and 110 and from the plate of the right tube in the multivibrator 106.

The gate circuit 228 has input terminals connected to the coil 50, to the output terminal of the driver stage 179 and to the common terminal between a grounded resistance 229 and the cathodes of diodes 230 and 231. The plate of the diode 230 has voltage applied to it from the output terminal of an amplified 232 having its input terminal connected to the movable contact of the switch 203. Voltage is applied to the plate of the diode 231 from the plate of the left tube in the multivibrator 114.

Figure 3:
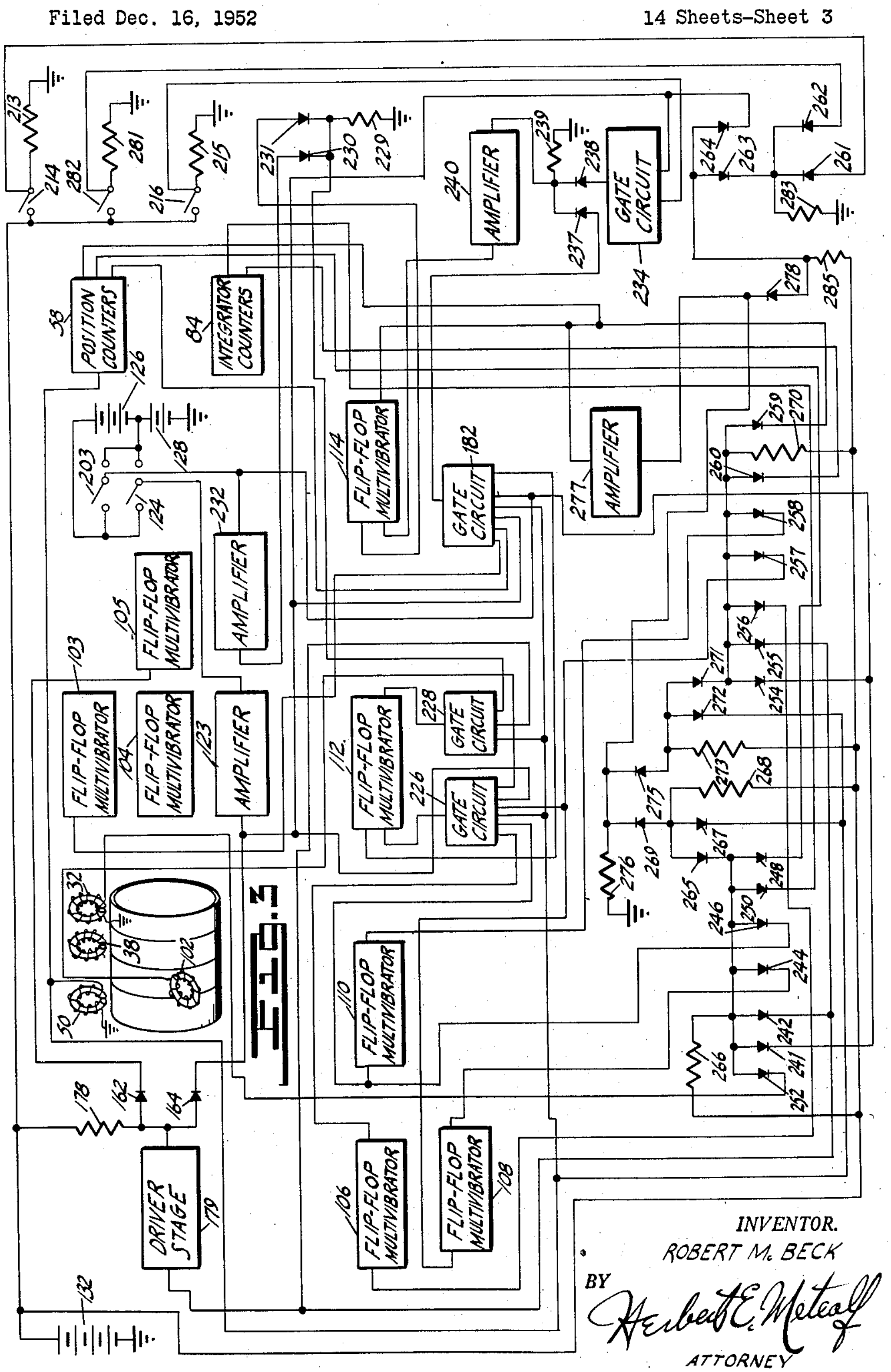

The gate circuit 182 shown in block form in Figure 3 and also shown in block form in Figure 2 is associated with the grid of the left tube in the multivibrator 114. Connections are made to input terminals of the gate circuit 182 from the coil 50, the movable contact of the switch 203, the output terminal of the amplifier 123 and the plates of the left tubes in the multivibrators 103 and 112. A connection is also made to an input terminal of the gate circuit 182 from the counter 58 for reasons which will be disclosed in detail hereinafter.

A gate circuit 234 is also associated with the grid of the left tube in the multivibrator 114. The gate circuit 234 receives input voltages from the output terminal of the amplifier 123 and from the movable contact of the switch 216. The outputs from the gate circuits 182 and 234 are respectively applied to the plates of diodes 237 and 238. Connections are made from the cathodes of the diodes 237 and 238 to a grounded resistance 239 and to the input terminal of an amplifier 240. The output terminal of the amplifier 240 is connected to the grid of the left tube in the multivibrator 114.

Because of the relative complexity of the diode networks associated with the right tube in the multivibrator 114, these networks are shown in detail. The networks include a first group of diodes 241, 242, 244, 246, 248, 250 and 252; a second group of diodes 254, 255, 256, 257, 258, 259 and 260; and a third group of diodes 261, 262, 263 and 264. The cathodes of the diodes 241 and 242 are connected to the movable contact of the switch 203 and to the output terminal of the driver stage 179, respectively. The cathodes of the diodes 244 and 246, respectively, have voltages applied to them from the plate of the right tube in the multivibrator 108 and the plate of the left tube in the multivibrator 110. Connections are respectively made to the cathodes of the diodes 248 and 250 and 252 from the counters 58 and 84 and from the coil 32.

In like manner, the cathodes of the diodes 254 and 255 are respectively connected to the movable contact of the switch 203 and to the driver stage 179. The voltages on the cathodes of the diodes 256, 257 and 258 are respectively controlled by the voltages on the plates of the left tube in the multivibrators 106 and 108 and on the plate of the right tube in the multivibrator 110. Connections to the diodes 259 and 260 are made from the counters 58 and 84, respectively.

The plates of the diodes 240, 242, 244, 246, 248, 250 and 252 are connected to the cathode of a diode 265 and to a resistance 266 in series with the battery 132. Connections are made from the plate of the diode 265 to the plate of a diode 267, to a resistance 268 and to the plate of a diode 269. The cathode of the diode 267 has voltage applied to it from the coil 50, and the resistance 268 is in series with the battery 132.

Similarly, the plates of the diodes 254, 255, 256, 257, 258, 259 and 260 are connected to a resistance 270 in series with the battery 132 and to the cathode of a diode 271. The plate of the diode 271 has a common terminal with the plate of a diode 272, a resistance 273 and the plate of a diode 275. Voltage is applied to the cathode of the diode 272 from the coil 50, and voltage is applied to the resistance 273 from the battery 132.

The cathodes of the diodes 269 and 275 are connected to a grounded resistance 276 and to the input terminal of an amplifier 277. The cathodes of the diodes 269 and 275 are also connected to the cathode of a diode 278, the plate voltage of which is controlled by the network formed by the diodes 261, 262, 263 and 264. The plate of the diode 261 is connected to the movable contact of the switch 214. Similarly, the plate of the diode 262 is connected to a grounded resistance 281 and to the movable contact of a switch 282 having its stationary contact connected to the positive terminal of the battery 132. The switch 282 corresponds in function to the switches 355 and 358 shown in Figure 50 of co-pending application Serial No. 217,478.

Connections are made from the cathodes of the diodes 261 and 262 to a grounded resistance 283 and to the cathode of the diode 263. The plate of the diode 263 has a common terminal with the plate of the diode 264, the cathode of which has voltage applied to it from the amplifier 123. The plate of the diode 263 also has a common terminal with the plate of the diode 278 and with a resistance 285 in series with the battery 132. The voltage on the cathode of the diode 278 is inverted by the amplifier 277 and applied in inverted form to the grid of the right tube in the multivibrator 114.

Figure 4:
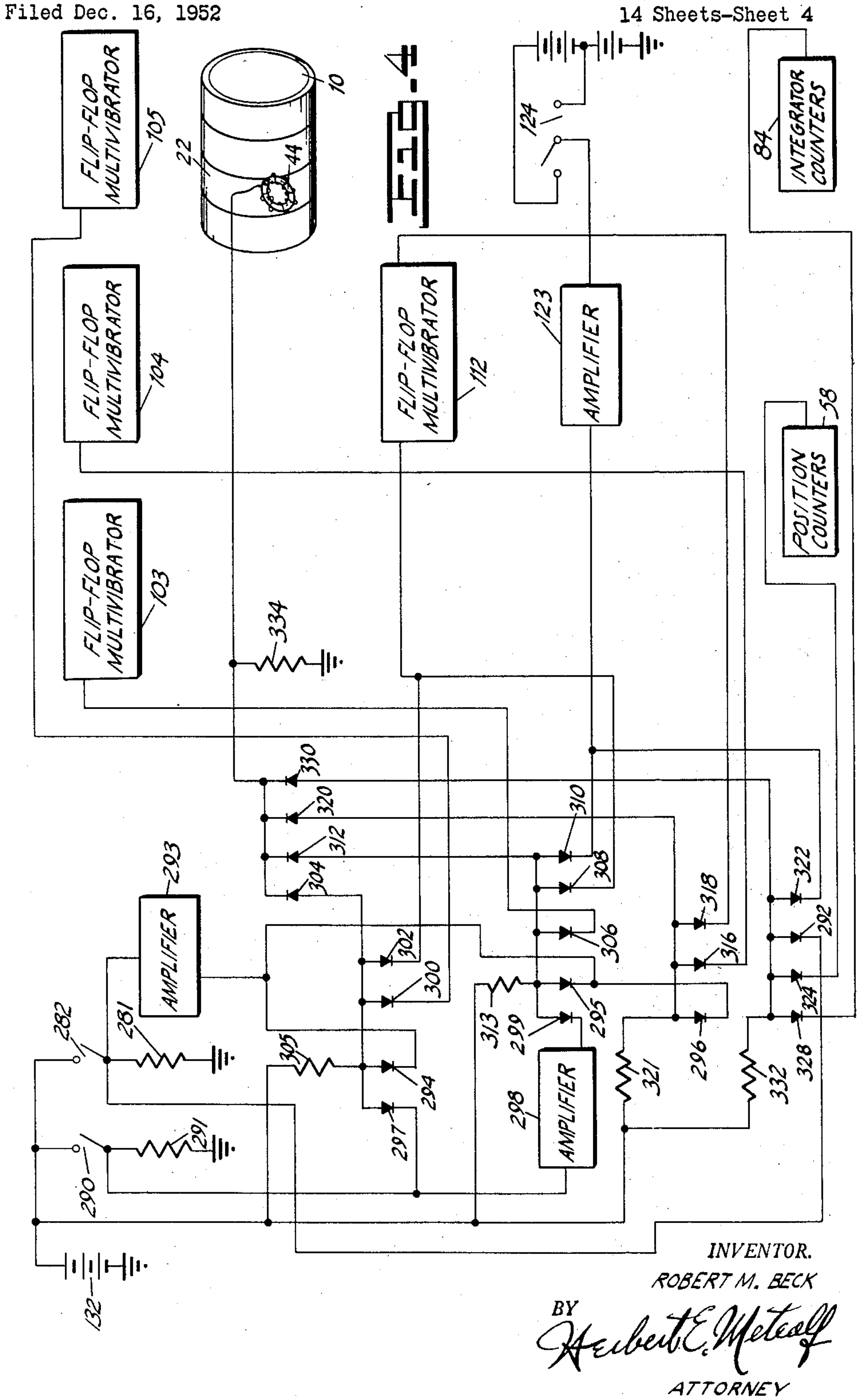

As shown in Figure 4, components are also provided for recording coding information in the channel 22. These components include the switch 282 and a manually operated, single-pole, single-throw switch 290 similar to the switch 282. The switch 290 performs functions similar to the "Shift Left" switch shown in Figure 50 of co-pending application Serial No. 217,478. The stationary contact of the switch 290 is connected to the positive terminal of the battery 132, and the movable contact of the switch is connected to a grounded resistance 291.

Connections are made from the movable contact of the switch 282 to the cathode of a diode 292 and through an amplifier 293 to the cathodes of diodes 294, 295 and 296. In addition to being connected to the resistance 291, the movable contact of the switch 290 is connected to a diode 297 and through an amplifier 298 to the cathode of a diode 299.

The diodes 294 and 297 form a network with diodes 300 and 302. The cathodes of the diodes 300 and 302 respectively have voltages applied to them from the plates of the left tubes in the multivibrators 105 and 112. The plates of the diodes are connected to the plate of a diode 304 and through a suitable resistance 305 to the positive terminal of the battery 132.

In like manner, the diodes 295 and 299 form a network with diodes 306, 308 and 310. Connections are made from the cathode of the diode 310 to the output terminal of the amplifier 123 and from the cathodes of the diodes 306 and 308 to the plates of the left tubes in the multivibrators 103 and 112, respectively. The plates of the diodes 295, 299, 306, 308 and 310 are connected to the plate of a diode 312 and through a suitable resistance 313 to the positive terminal of the battery 132.

Diodes 316 and 318 are associated with the diode 296. The cathodes of the diodes 316 and 318 have voltages respectively applied to them from the plate of the left tube in the multivibrator 104 and the plate of the right tube in the multivibrator 112. Connections are made from the plates of the diodes 296, 316 and 318 to the plate of a diode 320 and through a suitable resistance 321 to the positive terminal of the battery 132.

Another network is formed by the diode 292 and by diodes 322, 324 and 328. The cathode of the diode 322 is connected to the output terminal of the amplifier 123, and the cathodes of diodes 324 and 328 have signals applied to them from the counters 58 and 84, respectively. The plates of the diodes 292, 322, 324 and 328 are connected to the plate of a diode 330 and through a suitable resistance 332 to the positive terminal of the battery 132. The diode 330 forms a network with the diodes 304, 312 and 320 such that the cathodes of the diodes are connected to a grounded resistance 334 and to the coil 44 in the channel 22.

Just as information is coded into the pulse positions in the channel 22 under the control of a plurality of diode networks, information is also introduced into the channels 16 and 18 under the control of a plurality of networks. The relationship between the networks for properly introducing the information into the channel 18 is shown in Figure 5, but similar networks may be employed to introduce the information properly into the channel 20.

Figure 5:
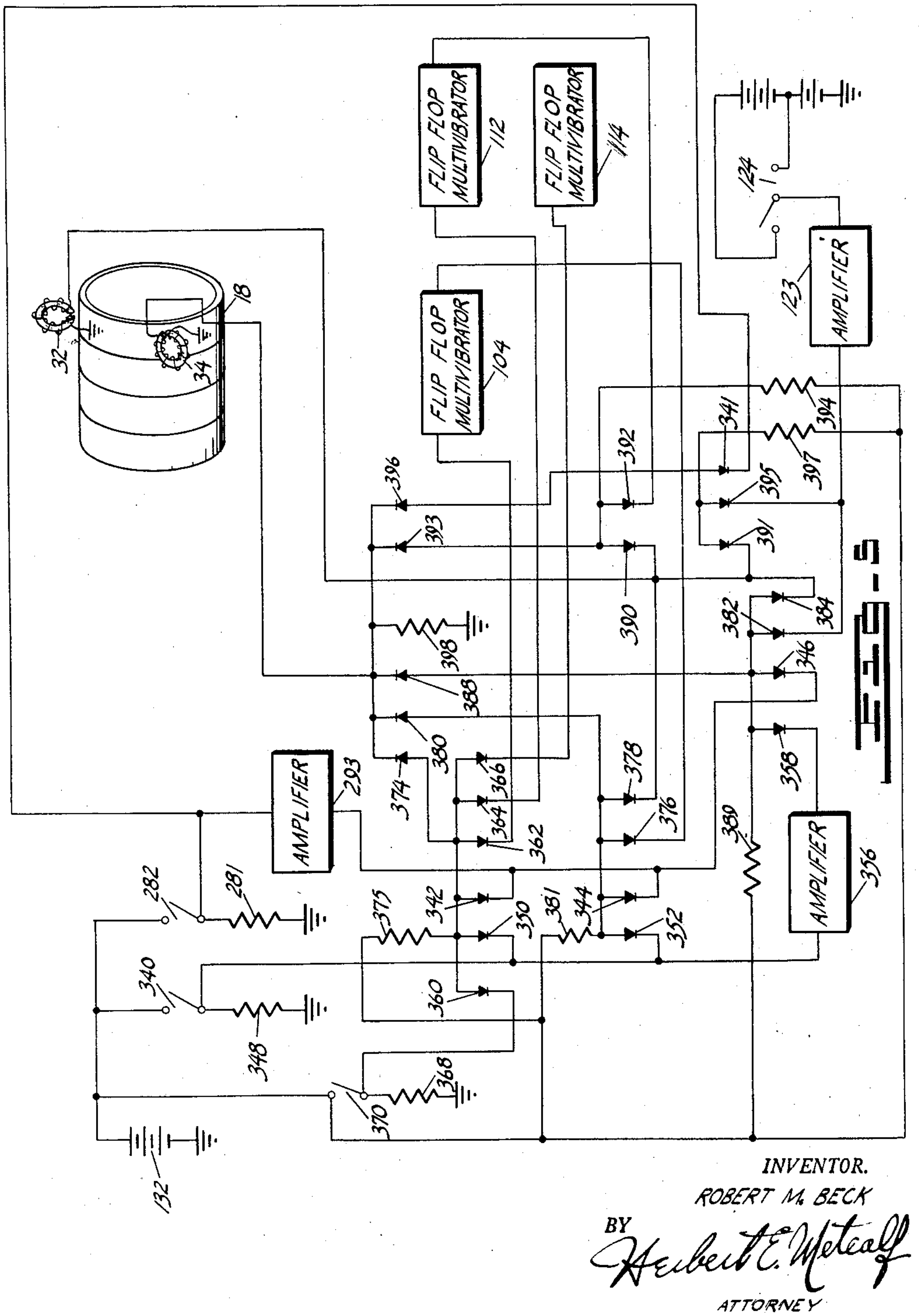

The components shown in Figure 5 include the switch 282 and a switch 340 corresponding in function to the switch designated as "Fill Y" in Figure 50 of co-pending application Serial No. 217,478. The movable contact of the switch 282 is connected directly to the cathode of a diode 341 and through the amplifier 293 to the cathodes of diodes 342, 344 and 346. Connections are made from the stationary contact of the switch 340 to the positive terminal of the battery 132 and from the movable contact of the switch to a grounded resistance 348 and to the cathodes of diodes 350 and 352. The movable contact of the switch 340 is also connected through an amplifier 356 to the cathode of a diode 358.

The diodes 342 and 350 form a network with diodes 360, 362, 364 and 366. The cathode of the diode 360 is connected to a grounded resistance 368 and to the movable contact of a switch 370 having its stationary contact connected to the positive terminal of the battery 132. The cathodes of the diodes 362, 364 and 366 have voltages applied to them from the plates of the left tubes in the multivibrators 104, 112 and 114, respectively. The plates of the diodes 342, 350, 360, 362, 364 and 366 are connected to the plate of a diode 374 and through a suitable resistance 375 to the positive terminal of the battery 132.

Diodes 376 and 378 are associated in a network with the diodes 344 and 352. The cathode of the diode 378 receives signals from the coil 32, and the cathode of the diode 376 has a voltage applied to it from the plate of the right tube in the multivibrator 104. The plates of the diodes 344, 352, 376 and 378 have a common terminal with the plate of a diode 380 and with a resistance 381 in series with the battery 132.

In like manner, diodes 382 and 384 form a network with the diodes 346 and 358. Connections are made from the cathode of the diode 384 to the coil 32 and from the cathode of the diode 382 to the output terminal of the amplifier 123. The plates of the diodes 346, 358, 382 and 384 have a common terminal with the plate of a diode 388 and with a resistance 389 in series with the battery 132.

In addition to being connected to the cathodes of the diodes 378 and 384, the coil 32 is also connected to the cathodes of diodes 390 and 391. The diode 390 forms a network with a diode 392, the cathode of which receives voltage from the plate of the right tube in the multivibrator 112. The plates of the diodes 390 and 392 are connected to the plate of a diode 393 and to a resistance 394 in series with the battery 132.

The diode 391 forms a network with the diode 341 and a diode 395, the cathode of which is connected to the output terminal of the amplifier 123. Connections are made from the plates of the diodes 341, 391 and 395 to the plate of a diode 396 and to a resistance 397 in series with the battery 132. The diode 396 forms a network with the diodes 374, 380, 388 and 393 such that the cathodes of the diodes are connected to a grounded resistance 398 and to the coil 34.

Figure 6:
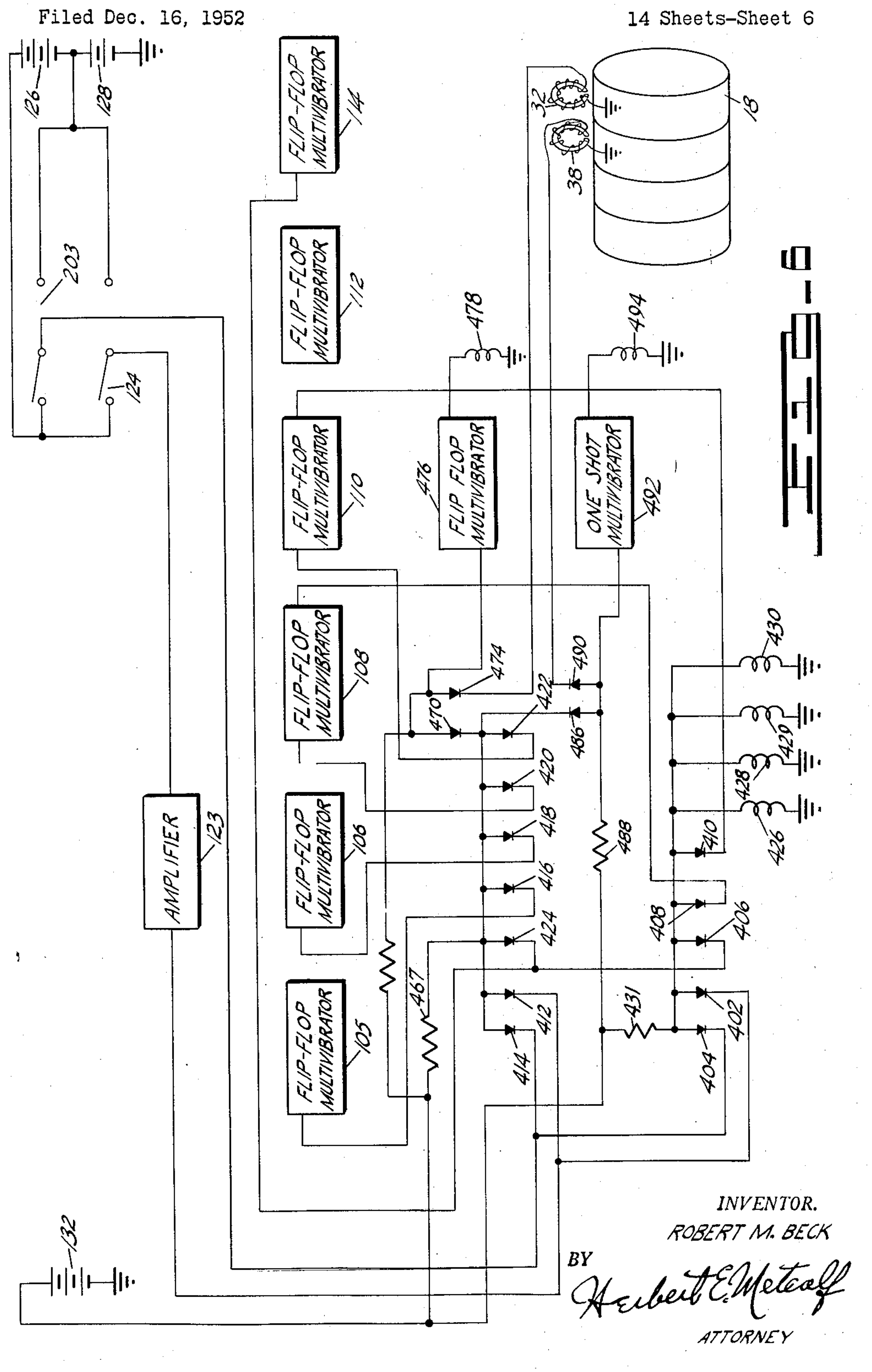

In addition to the diode networks disclosed above, other diode networks are provided to perform functions which will be disclosed in detail hereinafter. These networks are shown in Figure 6. One of the networks includes diodes 402, 404, 406, 408 and 410, and the other network includes diodes 412, 414, 416, 418, 420, 422 and 424.

Connections are made from the cathodes of the diodes 402 and 404 to the output terminal of the amplifier 123 and to the movable contact of the switch 203, respectively. The cathode of the diode 406 receives its voltage from the plate of the left tube in the multivibrator 114, and the cathodes of the diodes 408 and 410 respectively receive their voltages from the plates of the right tubes in the multivibrators 108 and 110. The plates of the diodes 402, 404, 406, 408 and 410 are connected to grounded solenoids 426, 428, 429 and 430 and through a suitable resistance 431 to the positive terminal of the battery 132.

An armature 342 (Figure 7) is associated with the solenoid 426 and is mechanically connected to a pawl 434 which engages the teeth of a gear 436. The gear 436 is mounted on a shaft 438 which also carries a reel 440. A tape 442 is secured at one end to the reel 440 and at the other end to a reel 444. The tape is adapted to become increasingly wound on the reel 440 and correspondingly unwound from the reel 444 as the solenoid 426 becomes successively energized.

The tape 442 is provided with a plurality of holes which indicate in coded form the pattern in which the digital differential analyzer shown in Figure 11 is to be coded for the solution of a mathematical problem. A first series of regularly spaced holes 446 is provided to control the distance that the tape is moved each time that the solenoid 428 is energized. Each time that the tape moves, it is limited by a dog 448 to a travel between successive holes 446. The dog 448 is spring loaded as at 449 for positioning in the holes 446 and is lifted from the holes by the action of the solenoid 428 every time that the solenoid is energized. Since the solenoid 430 is energized at the same time as the solenoid 428, the dog 448 is released from the holes 446 simultaneously with the actuation of the tape 442.

In addition to the series of holes 446, second and third series of holes 450 and 452 are provided in the tape 442 to control the magnetic pattern which is provided in successive positions in the channels 18 and 20, respectively. The holes 450 are aligned with certain of the holes 446 to indicate that a relatively high level of magnetization is to be provided in particular pulse positions in the channel 18. At the positions adjacent to the other holes 446, no holes corresponding to the holes 450 are provided in the tape. The absence of a hole 450 at a position indicates that a low level of magnetization is to be provided in a corresponding pulse position in the channel 18.

A spring-loaded pawl 454 is adapted to ride on the tape above the holes 450. The pawl 454 carries the movable contact of the switch 370 into engagement with the stationary contact of the switch when the pawl becomes positioned in a hole 450. Similarly, a spring-loaded pawl 456 rides above the holes 452 to provide for the opening and closing of a switch 458 in accordance with the pattern of the holes 452. The switch 458 operates in the channel 20 in a manner similar to the operation of the switch 370 in the channel 18.

A tape 460 (Figure 8) similar to the tape 442 is also provided to insure that the proper coding information is inserted into the channels 18 and 20. The movement of the tape 460 is controlled by the solenoids 429 and 430, which correspond in operation to the solenoids 426 and 428, respectively. The solenoids 429 and 430 operate on a pawl 463 and a dog 464 similar to the pawl 434 and the dog 448, respectively. The coded pattern provided in the tape 460 is controlled by the operation of the network formed by the diodes 412, 414, 416, 418, 420, 422 and 424 shown in Figure 6.

In the network shown in Figure 6, connections are made from the cathodes of the diodes 412 and 414 to the output terminal of the amplifier 123 and to the movable contact of the switch 203, respectively. The cathodes of the diodes 416, 418, 420, 422 and 424 receive voltages from the plates of the left tubes in the multivibrators 105, 106, 108, 110 and 114.

The plates of the diodes 412, 414, 416, 418, 420, 422 and 424 are connected to a resistance 467 in series with the battery 132 and to the cathode of a diode 470, the plate of which is connected to a resistance in series with the battery 132. The plate of the diode 470 also has a common terminal with the plate of a diode 472 and the grid of the left tube in a one-shot multivibrator 476. The cathode of the diode 474 is connected to the coil 32, and the plate of the right tube in the multivibrator 476 is connected to a grounded solenoid 478. A spring-loaded plunger 480 (Figure 8) is adapted to be actuated so as to produce a series of holes 482 in the tape 460 corresponding to the magnetic pattern imposed in the different pulse positions in the channel 18 (Figure 11).

Connections are also made from the plates of the diodes 412, 414, 416, 418, 420, 422 and 424 to the cathode of a diode 486 having its plate connected to a resistance 488 in series with the battery 132 and to the plate of a diode 490, the cathode of which is connected to the coil 38. A connection is also made from the plates of the diodes 486 and 490 to the grid of the left tube in a one-shot multivibrator 492 having the plate of its right tube connected to a grounded solenoid 494. The solenoid 494 is adapted to actuate a spring-loaded plunger 496 (Figure 8) to produce a series of holes 498 in the tape 460 corresponding to the magnetic pattern imposed in the different pulse positions in the channel 20 (Figure 11).

To place the system disclosed above into operation, the switch 282 (Figure 4) is manually closed and the movable contact of the switch 124 is manually pivoted into engagement with the right stationary contact. When the movable contact of the switch 282 is closed, current flows through a circuit including the battery 132, the switch 282 and the resistance 281. The flow of current through the resistance 281 causes a relatively high voltage to be produced across the resistancee for introduction to the cathode of the diode 292.

The continuity that is established between the movable contact of the switch 124 and the right stationary contact of the switch causes a positive voltage of relatively low magnitude to be applied to the movable contact. This voltage is inverted by the amplifier 123 and introduced as a relatively high voltage to the cathode of the diode 322.

Because of the particular connections from the counters 58 and 84 to the diodes 324 and 328, the voltages on the cathodes of the diodes become relatively high at the 48th pulse position of a particular integrator, such as Integrator "22." The manner in which connections are made from the counters 58 and 84 to obtain high voltages at pulse position 48 of Integrator "22" is fully disclosed in co-pending application Serial No. 217,478.

Since the cathodes of the diodes 292, 322, 324 and 328 all have relatively high voltages at pulse position 48 of Integrator "22," current is unable to flow from the battery 132 through the resistance 332 and the diodes. This causes the voltage on the plate of the diodes to become relatively high. Upon introduction to the plate of the diode 330, this high voltage produces a flow of current through the diode 330 and the resistance 334. The flow of current through the resistance 334 produces a high voltage across the resistance such that a relatively high level of magnetization is introduced by the coil 44 to the appropriate pulse position in the channel 22.

Upon a further rotation of the drum 10 so that pulse position 48 of Integrator "22" is no longer presented for utilization, the voltages on the cathodes of the diodes 324 and 328 become relatively low. This causes current to flow from the battery 132 through a circuit including the battery 132, the resistance 332 and the diodes 324 and 328. The flow of current through the resistance 322 causes a voltage drop to be produced across the resistance and the voltage on the plates of the diodes 324 and 328 to fall below that which was produced when the diodes were cut off. This relatively low voltage interrupts the flow of current through the resistance 334.

As will be seen from the above disclosure, the network formed by the diodes 292, 322, 324 and 328 operates to produce a relatively high voltage on the plates of the diodes only when relatively high voltages are simultaneously introduced to the cathodes of all of the diodes in the network. Such a network may be designated as an "and" network. However, the network formed by the diodes 304, 312, 320 and 330 operates to produce a flow of current through the resistance 334 when a relatively high voltage is produced on the plate of any one of the diodes in the network. Such a network may be designated as an "or" network.

After a pulse has been recorded in pulse position 48 of Integrator "22," the switch 282 is manually opened.

The movable contact of the switch 203 (Figures 3 and 6) is then manually pivoted into engagement with the left stationary contact. Since the left stationary contact of the switch 203 is connected to the positive terminal of the battery 126, a relatively high voltage is applied to the movable contact of the switch. At the same time as the switch 203 is operated, the switch 340 (Figure 5) is manually closed to establish a continuous circuit through the switch and the resistance 348. The resultant flow of current through the resistance 348 causes a relatively high voltage to be produced on the movable contact of the switch.

Upon the opening of the switch 282, the marker pulse introduced to pulse position 48 of Integrator "22" is recirculated because of the operation of the network formed by the diodes 296, 316 and 318 (Figure 4). The network formed by the diodes 296, 316 and 318 is an "and" network since it operates to pass a pulse only when relatively high voltages are simultaneously introduced to the cathodes of all of the diodes in the network.

The voltage on the cathode of the diode 296 becomes relatively high when the switch 282 is opened. By opening the switch 282, the flow of current through the resistance 281 is interrupted and the resistance becomes grounded. This relatively low voltage is inverted by the amplifier 293 and is applied as a relatively high voltage to the cathode of the diode 296.

The cathode of the diode 316 has a relatively high voltage applied to it when the left tube in the multivibrator 104 becomes cut off. Since the operation of the multivibrator 104 is controlled by the multivibrator 103, the operation of the multivibrator 103 must first be disclosed in detail. The multivibrator 103 is controlled in operation by the networks formed by the diodes 116, 117, 118, 119, 120 and 122 (Figure 1) and the networks formed by the diodes 136, 137, 138, 139, 140 and 142.

Since the movable contact of the switch 124 is in engagement with the right stationary contact of the switch, the movable contact has a relatively low voltage. This voltage is inverted by the amplifier 123 and introduced as a relatively high voltage to the plate of the diode 117. The high voltage on the plate of the diode 117 causes current to flow through the diode and through the resistance 129 so that a relatively high voltage is produced across the resistance. This voltage is introduced to the cathode of the diode 119, which forms an "and" network with the diode 120.

Because of the spacing between the coil 44 and the coil 102, the voltage on the cathode of the diode 120 becomes relatively high at a time substantially 1055 pulse positions after the marker pulse has been recorded in pulse position 48 of Integrator "22." Since the voltage on the cathode of the diode 119 is also relatively high at this time, a relatively high voltage is introduced from the plates of the diodes 119 and 120 to the cathode of the diode 116. The cathode of the diode 122 also receives a relatively high voltage at this instant from the coil 50, since the coil 50 produces a cyclic signal in each pulse position. This causes a relatively high voltage to be introduced from the plates of the diodes 116 and 122 to the grid of the left tube in the multivibrator 103.

When the negative half of the cyclic signal is produced by the coil 50, the cathode of the diode 122 receives a relatively low voltage. Because of this relatively low voltage, current flows through a circuit including the battery 132, the resistance 134 and the diode 122 and produces a voltage drop across the resistance. This voltage drop in turn produces a reduction in the voltage on the plate of the diode 122, such that a relatively low voltage is introduced to the grid of the left tube in the multivibrator 103. Upon the introduction of this relatively low voltage to its grid, the left tube in the multivibrator 103 becomes cut off and a relative high voltage is produced on its plate.

The relatively high voltage produced on the plate of the left tube in the multivibrator 103 is introduced to the gate circuit 150, which is formed from a plurality of diodes connected in a manner somewhat similar to the diodes 116, 117, 118, 119, 120 and 122. Since an input terminal of the gate circuit 150 is connected to the coil 50, the gate circuit passes a triggering signal during the negative half of the next pulse from the coil 50.

The triggering signal passing through the gate circuit 150 corresponds to a time 1056 pulse positions after the introduction of the marker pulse in pulse position 48 of Integrator "22." Since the digital differential analyzer is formed from 22 integrators each having 48 pulse positions, a total of 1056 pulse positions are provided in the integrator.

Thus the triggering signal passing through the gate circuit 150 occurs when pulse position 48 of Integrator "22" is presented for utilization a second time. This triggering signal cuts off the left tube in the multivibrator 104 and causes a relatively high voltage to be introduced to the cathode of the diode 316 (Figure 4).

At the time that a relatively high voltage is introduced from the plate of the left tube in the multivibrator 104 to the cathode of the diode 316, a relatively high voltage is also introduced to the cathode of the diode 318 from the plate of the right tube in the multivibrator 112. The operation of the multivibrator 112 in producing a relatively high voltage on the plate of its right tube at this instant will be disclosed in detail hereinafter.

Because of the simultaneous introduction of high voltages to the cathodes of the diodes 296, 316 and 318, the voltage on the plates of the diodes becomes relatively high. Upon introduction of this high voltage to the plate of the diode 320, current flows through the diode 320 and the resistance 334 and causes a relatively high voltage to be produced across the resistance for introduction to the coil 44. In this way, the marker pulse is inserted in pulse position 48 of Integrator "22" every time that the pulse position is made available for utilization.

The marker pulse is produced only at pulse position 48 of the Integrator "22" since the left tube in the multivibrator 103 becomes cut off only upon the introduction of a pulse from the coil 102. At the pulse position following the introduction of the marker pulse from the coil 102, the networks formed by the diodes 136, 137, 138, 139, 140 and 142 (Figure 1) operate to cut off the right tube in the multivibrator 103 and correspondingly to produce a flow of current through the left multivibrator tube.

When the left tube in the multivibrator 104 becomes cut off substantially 1056 positions after each recordation of the marker pulse in the channel 22, it introduces a relatively high voltage to the gate circuit 154. The gate circuit 154 operates in a manner similar to the gate circuit 150 to trigger the left tube of the multivibrator 105 into a state of nonconductivity. The left tube in the multivibrator 105 is cut off substantially 1157 pulse positions after the marker signal is introduced into the channel 22.

The network formed by the diodes 166, 168, 170 and 172 (Figure 2) causes the left tube in the multivibrator 106 to become cut off at the pulse position immediately following that in which the left tube in the multivibrator 105 is cut off. This corresponds to a time substantially 1058 pulse positions after the insertion of the marker pulse in the pulse position 48 of Integrator "22." The left tube in the multivibrator 106 remains cut off during the rotation of the drum 10 through a complete revolution corresponding to 1056 pulse positions.

Figure 9:
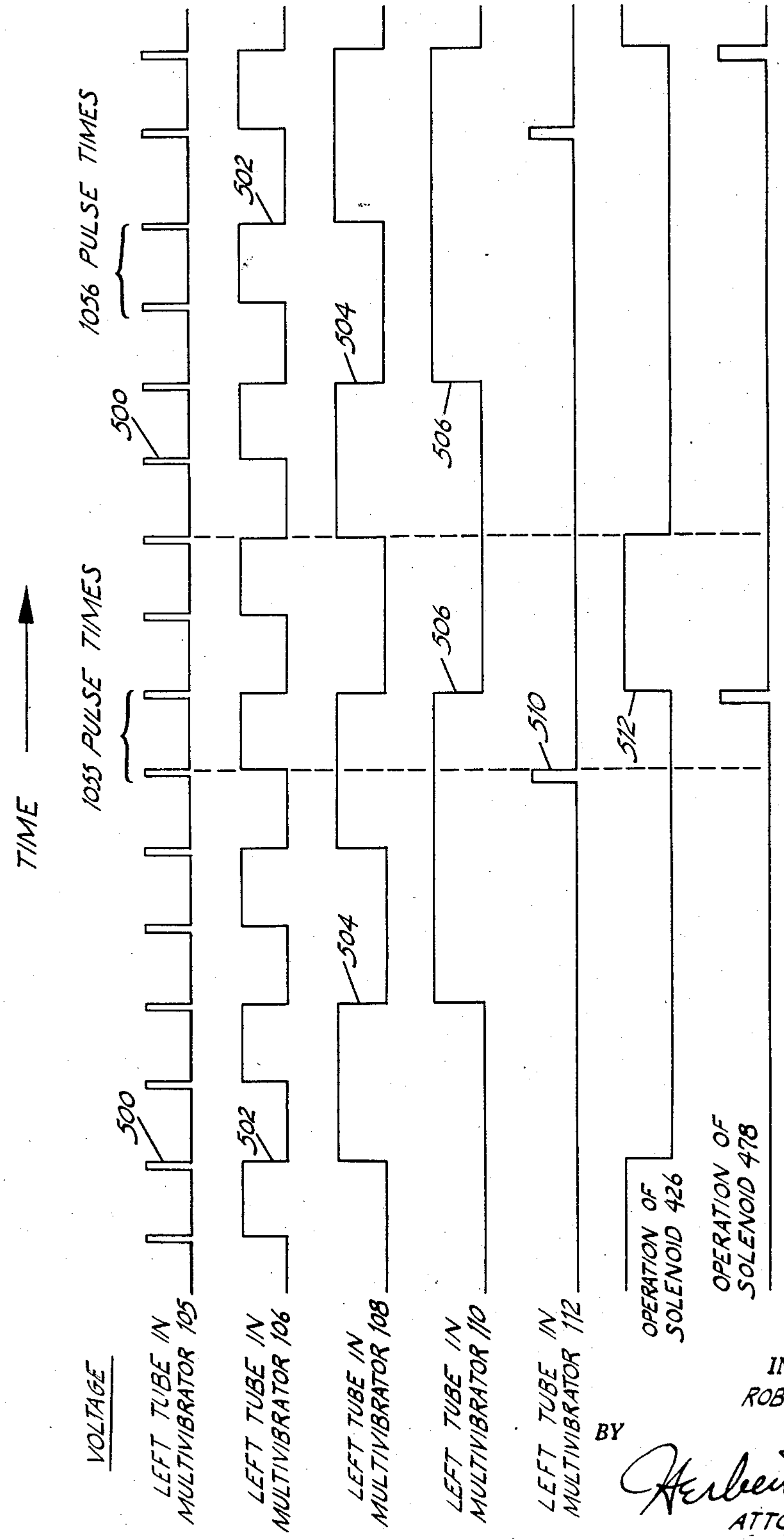
Figures 9 and 10 represent curves which illustrate the operation of some of the components shown in Figures 1 to 8, inclusive.

After the drum 10 has rotated through 1056 positions following the insertion of the marker pulse, the marker pulse is again inserted because of the operation of the network formed by the diodes 296, 316 and 318 (Figure 4). Upon the subsequent rotation of the drum 10 through one more pulse position after the reinsertion of the marker pulse, the left tube in the multivibrator 105 becomes cut off for a second time and produces a relatively high voltage on its plate. The operation of the multivibrator 105 in producing a relatively high voltage on the plate of the left tube for each revolution of the drum through substantially 1056 positions is illustrated at 500 in Figure 9.

Since the second positive pulse 500 produced by the multivibrator 105 is introduced simultaneously with other high voltages to the network formed by the diodes 184, 185, 186 and 187, the network produces a triggering signal which cuts off the right tube in the multivibrator 106. In this way, the multivibrator 106 becomes triggered from one state of operation into an alternate state every time that the left tube in the multivibrator 105 starts to conduct after having been cut off. The resultant pattern of the voltage produced on the plate of the left tube in the multivibrator 106 is illustrated at 502 in Figure 9.

Similarly, the multivibrator 108 becomes triggered from one state of operation into an alternate state every time that the left tubes in the multivibrators 104 and 106 simultaneously start to conduct after having been cut off. The resultant pattern of the voltage on the plate of the left tube in the multivibrator 108 is illustrated at 504 in Figure 9. The multivibrator 110 in turn becomes triggered from one state of operation into an alternate state every time that the left tubes in the multivibrators 104, 106 and 108 simultaneously start to conduct after having been cut off. This causes a voltage pattern indicated at 506 in Figure 9 to be produced on the plate of the left tube in the multivibrator 110. In this way, the multivibrators 104, 106, 108 and 110 operate to provide a count of the number of times that the marker pulse is presented for utilization. By this count, the left tube in the multivibrator 110 becomes cut off after the drum 10 has rotated eight times through substantially 1056 pulse positions in each revolution.

When the drum 10 has revolved through eight complete revolutions comprising 1056 pulse positions in each revolution, the gate circuit 226 (Figure 3) passes a triggering signal to the multivibrator 112. The gate circuit 226 passes the triggering signal at a time when the left tubes in the multivibrators 108 and 110 are cut off and the left tube in the multivibrator 106 is conducting. Since the gate circuit 226 has an input terminal connected to the coil 102, the triggering signal passes through the gate circuit 226 at the instant that the marker signal is picked up by the coil 102. The triggering signal passing through the gate circuit 226 causes the left tube in the multivibrator 112 to become cut off and a relatively high voltage to be produced on the plate of the multivibrator tube. This voltage is illustrated at 510 in Figure 7.

Because of the particular connections to the gate circuit 228 (Figure 3), the gate circuit becomes energized substantially three pulse positions after the left tube in the multivibrator 112 is cut off. The gate circuit 228 is energized at this instant since it receives a relatively high voltage from the plate of the left tube in the multivibrator 105. The delay of substantially three pulse positions in the production of a relatively high voltage on the plate of the left tube in the multivibrator 105 occurs because of the operation of each of the multivibrators 103, 104 and 105 in delaying by one pulse position the signal picked up by the coil 102.

Since input terminals of the gate circuit 228 are connected to the plates of the left tubes in both the multivibrators 105 and 114, the gate circuit 228 can become energized only when the voltages on the plates of the left tubes in the multivibrators become simultaneously high. As will be disclosed in detail hereinafter, a relatively high voltage is produced on the plate of the left tube in the multivibrator 114 during such times as the drum 10 is being coded in the different pulse positions.

When the gate circuit 228 becomes energized, it passes a triggering signal which causes the right tube in the multivibrator 112 to become cut off. In this way, each pulse 510 of relatively high voltage produced on the plate of the left tube in the multivibrator 112 is limited to a length of substantially three pulse positions.

The recordation in the channel 18 of the coding information for pulse position 48 of Integrator "22" occurs during a particular one of the three pulse positions in which the left tube in the multivibrator 112 is cut off. The recordation occurs because of the operation of the network formed by the diodes 342, 350, 360, 362, 364 and 366 (Figure 5). Since the cathode of the diode 362 is connected to the plate of the left tube in the multivibrator 104, the particular pulse position for recording the value of the dependent quantity $y$ in the channel 18 coincides with the instant that the plate of the left tube in the multivibrator 104 is cut off. This occurs in the middle one of the three pulse positions during which the left tube in the multivibrator 112 is cut off. Since the middle one of the three positions for the pulse 510 corresponds to a pulse position substantially 1056 positions after the most recent insertion of the marker pulse in the channel 22, the value of the dependent quantity $y$ for pulse position 48 of Integrator "22" is inserted at the instant that the marker pulse is presented for recirculation. Because of this coincidence, the information for pulse position 48 of Integrator "22" is recorded in the proper position in the channel 18. Only at this pulse position is the network energized to record the value of $y$ in the channel 18.

Figure 7:
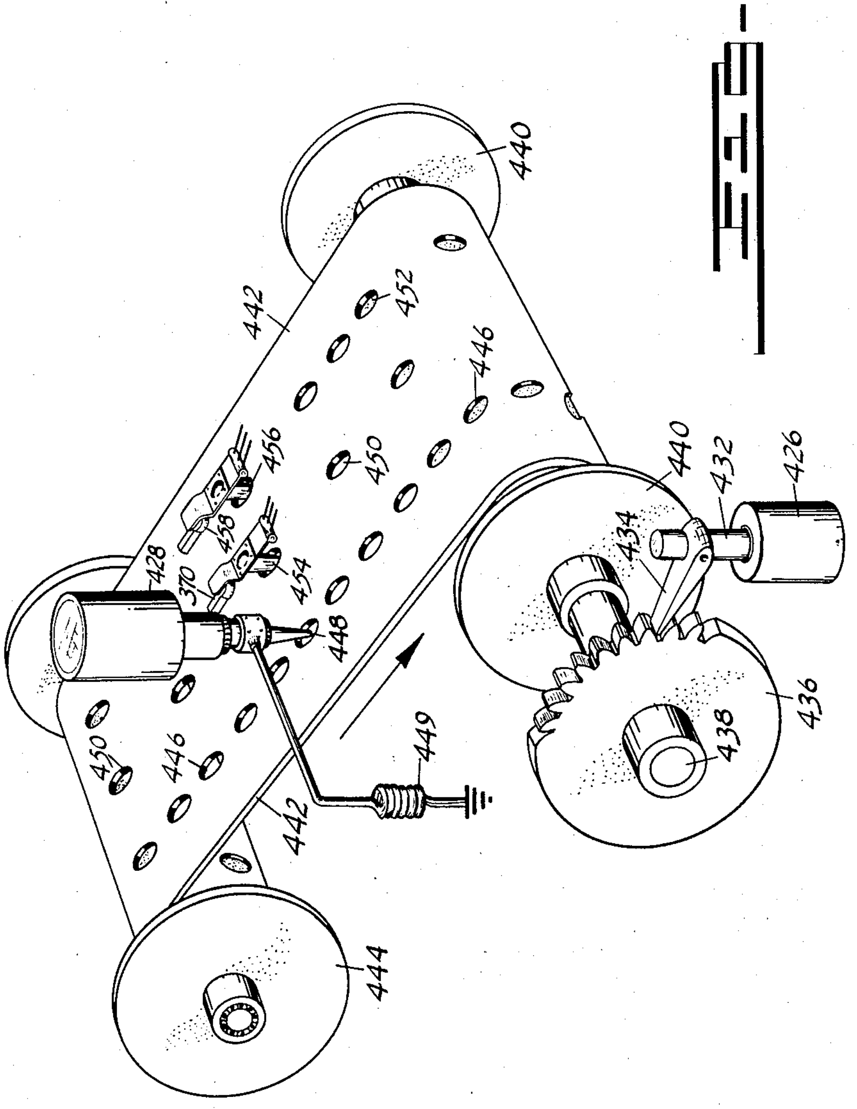
Figures 7 and 8 are perspective views illustrating the construction and operation of certain mechanical features of the invention and their effect on the operation of some of the electrical features shown in the previous figures.
Figure 8:
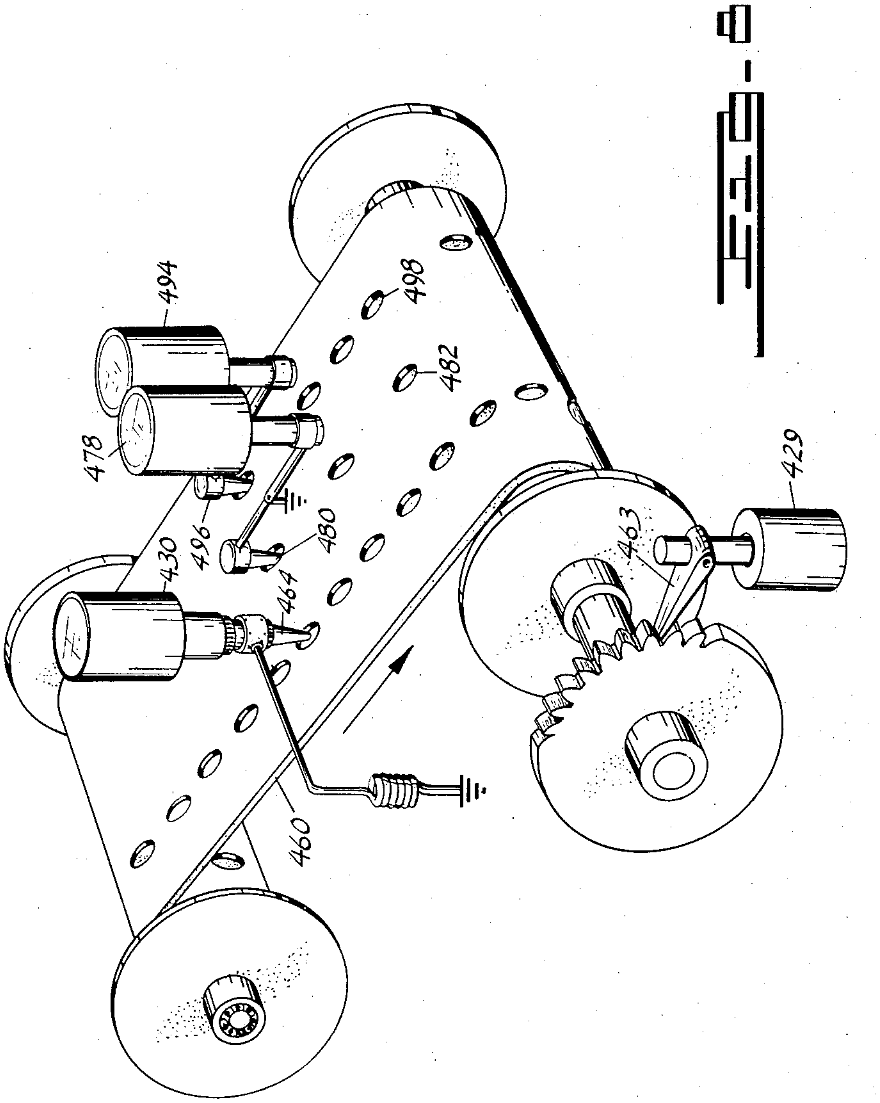

As previously disclosed, the movable contact of the switch 370 (Figures 5 and 7) is positioned in accordance with the movements of the pawl 454 (Figure 7). When the pawl 454 passes through one of the holes 450, the movable contact of the switch 370 is pivoted into engagement with the stationary contact of the switch. Upon an engagement between the movable and stationary contacts of the switch 370, current flows through a circuit including the battery 132, the switch 370 and the resistance 368 (Figure 5) and produces a relatively high voltage across the resistance.

The relatively high voltage produced across the resistance 368 is introduced to the cathode of the diode 360 at the same time that relatively high voltages are introduced to the cathodes of the diodes 342, 350, 362, 364 and 366. Because of the simultaneous introduction of relatively high voltages to the cathodes of the diodes, the voltage on the plates of the diodes becomes relatively high. This voltage causes current to flow through the diode 374 and the coil 34 so that a relatively large flux is produced by the coil. As a result of this flux, a relatively high level of magnetization is provided in the channel 18 at a position corresponding to pulse position 48 of Integrator "22."

When the pawl 454 does not pass through one of the holes 450, the switch 370 remains open and the movable contact of the switch continues at ground potential. Since the ground potential on the movable contact of the switch 370 is introduced to the cathode of the diode 360, it prevents the voltages on the plates of the diodes 342, 350, 360, 362, 364 and 366 from becoming relatively high. Since the network formed by the diodes is an "and" network, the voltages on the plates of the diodes cannot become high even though the cathodes of all the diodes in the network other than the diode 360 have relatively high voltages.

Because of the relatively low voltage on the plates of the diodes in the network when the pawl 454 does not pass through one of the holes 450, current cannot flow through the diode 374 and the coil 34. This in turn causes a relatively low level of magnetization to be induced in the channel 18 at the position corresponding to pulse position 48 of Integrator "22." In this way, the opening and closing of the switch 370 controls the level of magnetization that is inserted into the appropriate pulse position in the channel 18.

Just as the information for the value of the dependent quantity $y$ at pulse position 48 of Integrator "22" is recorded in the appropriate pulse position in the channel 18, the information for the coding of the independent quantity $x$ and information for the value of the output quantity $y\Delta x$ are recorded in the appropriate pulse positions in the channel 20. The level of magnetization provided in the channel 20 at the position corresponding to pulse position 48 of Integrator "22" is controlled by the presence or absence of a hole 452 in the tape 442 at the appropriate position in the tape. The presence or absence of a hole 452 in the tape in turn determines whether the switch 458 becomes closed or remains open.

After the appropriate information has been recorded in the channels 18 and 20 at the position corresponding to pulse position 48 of Integrator "22," the tape 442 is advanced to its next position. This causes the pawl 454 to be positioned in accordance with the information provided in the tape for pulse position 47 of Integrator "22." The tape is advanced to pulse position 47 of Integrator "22" because of the operation of the network formed by the diodes 402, 404, 406, 408 and 410 (Figure 6).

The network formed by the diodes 402, 404, 406, 408 and 410 is operated when the left tube in the multivibrator 114 is cut off and the left tubes in the multivibrators 108 and 110 are conductive. As will be seen at 512 in Figure 9, the particular combination of voltages in the multivibrators 108, 110 and 114 is first produced after the pulse 510 has been produced to initiate the recordation of the information in pulse position 48 of Integrator "22." The particular instant for operating the network formed by the diodes 402, 404, 406, 408 and 410 occurs substantially one revolution after the end of the pulse 510.

Upon the simultaneous introduction of relatively high voltages to the cathodes of the diodes 402, 404, 406, 408 and 410 (Figure 6), the voltage on the plates of the diodes becomes relatively high. This causes current to flow through the solenoids 426 and 427 so as to energize the solenoids. When the solenoid 428 is energized, it actuates the armature 432 (Figure 7) and the pawl 434 to produce a rotation of the gear 436 through an arc equivalent to one tooth.

The gear 436 in turn produces a corresponding rotation of the reel 440 and causes the tape 442 to become wound on the reel. The distance through which the tape 442 moves is equivalent to the distance between adjacent holes in the series 446. This distance is controlled by the solenoid 427, which raises the dog 448 for an instant so that the tape can advance from one hole to the next hole in the series 446. It is this movement of the tape which causes the coding information in pulse position 47 of Integrator "22" to be presented for utilization.

In order to insure that the solenoids 426 and 427 will be energized for a sufficient period of time to advance the tape 442 from one pulse position to the next, the network formed by the diodes 402, 404, 406, 408 and 410 (Figure 6) produces a signal for a period of time corresponding to two revolutions of the drum 10. The network produces a signal for two revolutions of the drum since the right tube in the multivibrator 108 remains cut off during this period and since the plate of the tube is connected to the cathode of the diode 408.

Some time after the coding information in pulse position 48 of Integrator "22" has been inserted into the channels 18 and 20 as appropriate magnetic signals, a check is provided. This check provides a determination as to whether or not the information inserted in the channels 18 and 20 is consistent with the coding information provided in the tape 442. The check is provided by the operation of the network formed by the diodes 412, 414, 416, 418, 420, 422 and 424. The network which includes the diodes is prepared for operation when the voltages on the plates of the left tubes in the multivibrators 105, 106, 108, 110 and 114 become simultaneously high. The simultaneous production of these high voltages takes place during the first revolution of the drum 10 after the information for pulse position 48 of Integrator "22" has been recorded in the channels 18 and 20. The relatively high voltage produced on the plates of the diodes 412, 414, 416, 418, 420, 422 and 424 is introduced to the cathode of the diode 470.

If the level of the magnetic signal recorded in the channel 18 for pulse position 48 of Integrator "22" is relatively high, the coil 32 produces a relatively high voltage at the time that the voltages on the cathodes of the diodes 416, 418, 420, 422 and 424 become simultaneously high. This voltage is introduced to the cathode of the diode 474 so as to cause the voltage on the plates of the diodes 470 and 474 to become relatively high. This high voltage causes current to flow through the left tube in the multivibrator 476 for a predetermined period of time and the right tube in the multivibrator to become cut off during this time. The resultant relatively high voltage on the plate of the right tube in the multivibrator 476 causes a relatively large current to flow through the solenoid 478. This large current causes the plunger 480 (Figure 8) to become actuated and a hole in the series 482 to be punched in the tape. The production of a relatively high voltage across the solenoid 478 to produce an actuation of the plunger 480 is illustrated at 514 in Figure 9.

On the other hand, if the coil 32 produces a relatively low signal for introduction to the cathode of the diode 474 (Figure 6), this signal prevents the voltage on the plate of the diode 474 and on the plate of the diode 470 associated with the diode 474 from becoming relatively high. The low voltage on the plates of the diodes prevents the left tube in the multivibrator 476 from starting to conduct and the right tube in the multivibrator from becoming cut off. This in turn prevents the solenoid 478 from being energized and the plunger 480 from being actuated. The absence of a hole in the tape 460 at a position corresponding to pulse position 48 of Integrator "22" indicates that a low level of magnetization has been inserted into the channel 18 at this position.

In like manner, a hole in the series 498 (Figure 8) is punched in the tape 460 at the position corresponding to pulse position 48 of Integrator "22" when a relatively high level of magnetization has been inserted into the channel 20 for this position. The hole is punched upon the operation of the "and" network formed by the diodes 486 and 490, which cause the left tube in the multivibrator 492 to start conducting and the right tube in the multivibrator to become cut off. No hole is punched when a relatively low level of magnetization has been inserted into the channel 20 for pulse position 48 of Integrator "22."

After the coding information for pulse position 48 of Integrator "22" has been inserted into the channels 18 and 20, the network formed by the diodes 295, 299, 306, 308 and 310 (Figure 4) operates. The network operates at this time because of the connection between the cathode of the diode 308 and the plate of the left tube in the multivibrator 112. Since the plate of the left tube in the multivibrator 103 is connected to the cathode of the diode 306, the network operates at a position substantially 1055 pulse positions after the previous insertion of the marker pulse in the channel 22. When the network operates, it produces on the plates of the diodes a relatively high voltage which causes current to flow through the diode 312 and the coil 44. This current causes a marker pulse to be inserted into the channel 22.

Since the above network produces a marker pulse 1055 positions after the insertion of the previous marker pulse and since 1056 pulse positions constitute one revolution of the drum 10, the network operates to shift the marker pulse by one pulse position. In this way, the marker pulse shifts from pulse position 48 of Integrator "22" to pulse position 47 of Integrator "22" so as to prepare the system disclosed above for inserting into the channels 18 and 20 the coding information for pulse position 47 of Integrator "22."

Even though the marker pulse shifts from pulse position 48 of Integrator "22" to pulse position 47 of Integrator "22," the information recorded in the channels 18 and 20 for pulse position 48 of Integrator "22" is recirculated in the drum 10. The recirculation takes place in the channel 18 because of the operation of the network formed by the diodes 344, 352, 376 and 378 (Figure 5). Because of the connection from the plate of the right tube in the multivibrator 104 to the cathode of the diode 376, the cathode of the diode 376 receives a relatively high voltage in each pulse position except that in which the marker pulse has been inserted. Since the switch 340 has been manually closed and the switch 282 manually opened, the cathodes of the diodes 352 and 344, respectively, have relatively high voltages applied to them.

The simultaneous introduction of relatively high voltages to the cathodes of the diodes 344, 352 and 376 prepares the network partially formed by the diodes for operation. If a signal of relatively high magnitude is induced in the coil 32, this signal passes through the network to the coil 34 so as to produce a magnetic signal having a relatively high level of magnetization. If a signal of low magnitude is induced in the coil 32, it is not able to pass through the network formed by the diodes 344, 352, 376 and 378. By preventing a signal of low magnitude from passing through the network, a magnetic signal of relatively low magnitude is induced by the coil 34 into the channel 18.

As previously disclosed, the information in the channel 20 is recirculated in the channel during the times that a switch corresponding to the switch 340 is closed. The information is recirculated in the channel 20 by the operation of a network corresponding to that formed by the diodes 344, 352, 376 and 378.

The information in the channel 18 is not only recirculated during the times that the switch 340 is closed, but it is also recirculated during the time that the switch 340 is manually opened. The switch 340 may be manually opened to prevent further information from being inserted into the channel 18 while new information continues to be coded into the channel 20. When the switch 340 is manually opened, the grounded voltage on its movable contact is inverted by the amplifier 356 so that a relatively high voltage is introduced to the cathode of the diode 358. Since the switch 282 has been manually opened, a relatively high voltage is also applied by the amplifier 293 to the cathode of the diode 346. The cathode of the diode 382 also receives a relatively high voltage because of the previous manual engagement between the movable contact and the right stationary contact of the switch 124. Thus, the network formed by the diodes 346, 358, 382 and 384 is prepared for the passage of information from the coil 32 to the coil 34. As will be seen, the information in the coil 32 passes to the coil 34 for each pulse position on the drum, including the pulse position in which the marker pulse is inserted.

The system operates in the sequential pattern disclosed above to insert the proper coding information into each pulse position in the channels 18 and 20 in accordance with the information provided in the tape 442 (Figure 7). After the coding information for one pulse position has been inserted into the proper position in the channels 18 and 20, the tape 460 (Figure 8) is coded with the information just inserted into the pulse position. The tapes 442 and 460 are then advanced to the next pulse position to prepare the system for subsequent operation. The marker pulse in the channel 22 is also advanced to the next pulse position so that the information for this position can be coded into the appropriate pulse positions in the channels 18 and 20.

Since there are 22 integrators in the digital differential analyzer, not all of them are always used to solve mathematical problems. For example, the solution of the problem shown in Figure 15 may be obtained by the use of only five integrators. Since the other integrators are not required in the solution of the problem, they do not have to be coded in their different pulse positions. Thus, in order to provide for a coding of the digital differential analyzer in a minimum amount of time, it is desirable that the pulse positions representing these integrators be traversed quickly. The multivibrator 114 and the diode networks associated with the multivibrator operate to provide for the quick passage of the coding operation through those integrators that are not required in the solution of a particular problem.

The multivibrator 114 and the diode networks associated with the multivibrator sense that a particular integrator is not required by determining whether or not a magnetic pulse of relatively large amplitude has been provided in the channel 18 in pulse position 48 for the integrator. If a pulse is provided in the channel 18 in pulse position 48 of the integrator, the integrator is not required for use. Since the integrator is not required for use, the insertion of a pulse in the channel 18 in pulse position 48 of the integrator does not affect the operation of the digital differential analyzer. If a pulse is not placed in pulse position 48 of the integrator, the integrator is required for use and has to be coded.

When a pulse is coded in the channel 18 in pulse position 48 of an integrator, the network formed by the diodes 241, 242, 244, 246, 248, 250 and 252 (Figure 3) operates. The network operates because relatively high voltages are simultaneously introduced to the cathodes of all the diodes in the network. The cathode of the diode 241 receives a relatively high voltage because of the previous manual engagement between the movable contact and the left stationary contact of the switch 203. Because of its connection to the counter 58, the cathode of the diode 248 receives a relatively high voltage at pulse position 48 of each integrator. The particular connections from the counter 84 cause the voltage on the cathode of the diode 250 to become relatively high for all integrators except Integrator "1." The reasons for excluding the operation of the network during the presentation of Integrator "1" for coding will be disclosed in detail hereinafter.

The network formed by the diodes 241, 242, 244, 246, 248, 250 and 252 (Figure 3) operates only when relatively high voltages are simultaneously applied to the network from the right tube in the multivibrator 108 and the left tubes in the multivibrators 105 and 110. The multivibrators 105, 108 and 110 simultaneously apply high voltages to the network when the drum 10 has rotated through substantially four revolutions after pulse position 48 of the integrator has been presented for coding. Control on the network by the multivibrator 105 is exerted through the driver stage 179.

When all of the diodes 241, 242, 244, 246, 248, 250 and 252 simultaneously have high voltages applied to their cathodes, the voltage on the plates of the diodes becomes relatively high. This voltage is applied to the cathode of the diode 265, which forms an "and" network with the diode 267. Since the diode 267 receives voltage from the coil 50, the voltage on the cathode of the diode becomes relatively high during the positive half of each cycle from the coil 50. This causes the voltage on the plates of the diodes 265 and 267 to become relatively high so that current flows through the diode 269 and the resistance 276.

Figure 10:
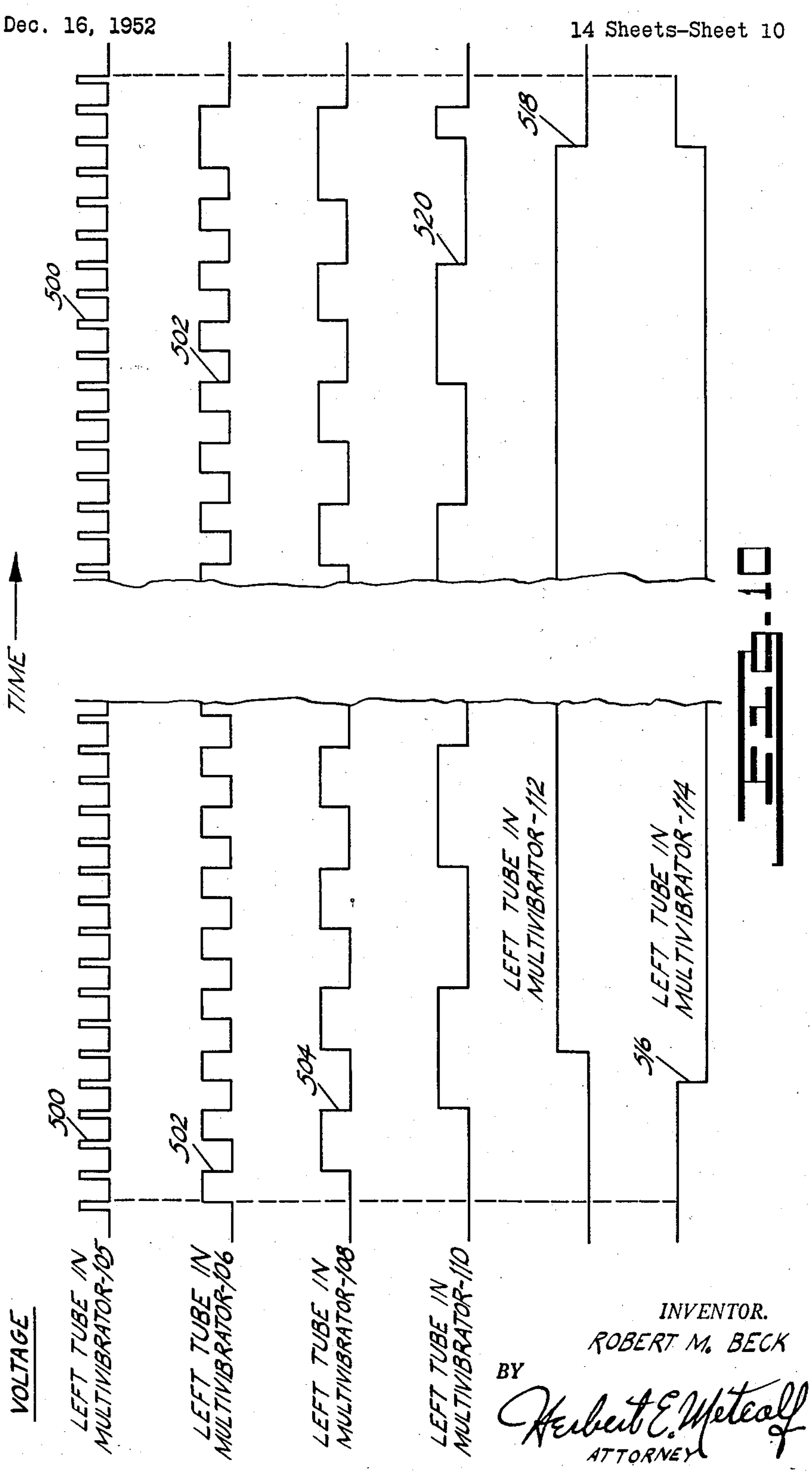

The current flowing through the resistance 276 produces across the resistance a relatively high voltage which is inverted by the amplifier 277 and applied as a relatively low voltage to the grid of the right tube in the multivibrator 114. This voltage cuts off the right tube in the multivibrator 114 and causes the left tube in the multivibrator to become conductive. The flow of current through the left tube in the multivibrator 114 produces a relatively low voltage on the plate of the tube, as indicated at 516 in Figure 10.

Because of the relatively low voltage on the plate of the left tube in the multivibrator 114, the network formed by the diodes 342, 350, 360, 362, 364 and 366 (Figure 5) cannot be operated. This prevents a magnetic signal of relatively high magnitude from being inserted in any new pulse position in the channel 18 until the left tube in the multivibrator 114 again becomes cut off. However, the networks formed by the diodes 344, 352, 376 and 378 and by the diodes 346, 358, 382 and 384 still operate to recirculate the information previously inserted into the channel 18.

During the time that the left tube in the multivibrator 114 is conducting, the left tube in the multivibrator 112 remains cut off. The left tube in the multivibrator 112 remains cut off because of the connection from the left tube of the multivibrator 114 through the diode 231 (Figure 3) to the gate circuit 228. Since the voltage on the plate of the left tube in the multivibrator 114 is relatively low, current cannot flow through the diode 231 and the voltage across the resistance 229 remains at ground potential. This relatively low voltage prevents the gate circuit 228 from passing a triggering signal to cut off the right tube in the multivibrator 112 during the time that the voltage on the plate of the left tube in the multivibrator 114 is relatively low. The operation of the left tube in the multivibrator 112 in remaining cut off is illustrated at 518 in Figure 10.

During the time that the left tube in the multivibrator 112 remains cut off, the network formed by the diodes 295, 299, 306, 308 and 310 (Figure 4) operates. As previously disclosed, the connection from the plate of the left tube in the multivibrator 103 to the cathode of the diode 306 causes the network to shift the marker pulse by one pulse position in the channel 22 every time that the network operates. For example, the network operates to shift the marker pulse in the channel 22 from pulse position 36 of the integrator in question to pulse position 35. The network operates to produce this shift in the marker pulse in the channel 22 upon each revolution of the drum, since the pulse 518 continues on the plate of the left tube in the multivibrator 112. In this way, the marker pulse is shifted in only 48 revolutions of the drum from pulse position 48 to pulse position 1 of an integrator not requiring coding.

The tapes 442 and 460 remain stationary while the marker pulse is being advanced rapidly in the channel 22 through the pulse positions of an integrator that does not require coding. The tape 442 remains stationary because its operation is controlled by the network formed by the diodes 402, 404, 406, 408 and 410 (Figure 6). Since the plate of the left tube in the multivibrator 114 is connected to the cathode of the diode 406 in the network, the relatively low voltage on the plate of the multivibrator tube prevents the left tube in the multivibrator 476 from being triggered into a state of conductivity. The resultant flow of current through the right tube in the multivibrator 476 causes a relatively low voltage to be introduced to the solenoid 478, as illustrated at 522 in Figure 10. A network similar to that formed by the diodes 402, 404, 406, 408 and 410 is also prevented from operating because of the low voltage on the plate of the left tube in the multivibrator 114. This network controls the operation of the tape 460.

The information previously inserted into the channel 18 is recirculated during the time that the marker pulse is being advanced rapidly through an integrator not requiring coding. The recirculation is provided by the network formed by the diodes 390 and 392 (Figure 5). The network operates at this time to recirculate signals from the coil 32 to the coil 34, because a relatively high voltage is introduced from the plate of the right tube in the multivibrator 112 to the cathode of the diode 392. The information previously inserted into the channel 20 is also recirculated during this period because of the operation of a network similar to that formed by the diodes 390 and 392.

After the marker pulse has been advanced rapidly in the channel 22 through an integrator not requiring coding, the gate circuit 182 (Figure 3) operates. The gate circuit operates at this time because of the connections to input terminals of the gate circuit from the counter 58 and from the plate of the left tube in the multivibrator 112. The plate of the left tube in the multivibrator 112 has a relatively high voltage at this time, as indicated at 518 in Figure 10.

When the gate circuit 182 operates, current flows through the diode 237 (Figure 3) and the resistance 239 and causes a relatively high voltage to be produced across the resistance. This voltage is inverted by the amplifier 240 so that a relatively low voltage is introduced to the grid of the left tube in the multivibrator 114 to cut off the tube.

The operation of the gate circuit 182 also causes relatively high voltages to be introduced to the amplifiers 183 (Figure 2) and 192. These voltages are inverted by the amplifiers 183 and 192 and are respectively introduced as relatively low voltages to the grids of the left tubes in the multivibrators 106 and 108 to cut off the tubes.

Upon the triggering of the left tube in the multivibrator 114 into a state of non-conductivity, a relatively high voltage is produced on the plate of the tube. This voltage is introduced to the plate of the diode 231 (Figure 3) to produce a current through the diode and the resistance 229. The resultant high voltage across the resistance 229 is introduced to an input terminal of the gate circuit 228 to open the gate circuit for the passage of a triggering signal. The signal passing through the gate circuit 228 triggers the right tube in the multivibrator 112 into a state of non-conductivity.

When the right tube in the multivibrator 112 becomes cut off, a relatively high voltage is introduced from the plate of the tube to an input terminal of the gate circuit 202 (Figure 2). This voltage prepares the gate circuit 202 for the passage of a signal to the grid of the right tube in the multivibrator 110 so as to cut off the tube. In this way, the multivibrators 106, 108, 110, 112 and 114 are prepared at the end of each integrator for the coding of the next integrator.

After the multivibrators 106, 108, 110, 112 and 114 have been operated to prepare the system shown in Figures 1 to 8, inclusive, for subsequent codings, pulse position 48 of the next integrator in the sequence is presented for utilization. If a magnetic pulse of relatively high magnitude has been inserted in the channel 18 in pulse position 48 of this next integrator, the system operates in a manner similar to that disclosed above to advance rapidly through the integrator. If no pulse appears in pulse position 48 of the integrator, the system operates in a manner similar to that disclosed above to insert the proper level of magnetization into the channels 18 and 20 for each pulse position in the integrator. The proper level of magnetization inserted into the channels 18 and 20 for each pulse position in the integrator is determined by the code provided in the tape 442.

Because of the connection from the counter 84 to the cathode of the diode 250 (Figure 3), the network formed by the diodes 241, 242, 244, 246, 248, 250 and 252 is prevented from operating during the time that Integrator "1" is presented for coding. Since the network cannot operate, the right tube in the multivibrator 114 cannot be triggered into a condition of non-conductivity. In this way, the marker pulse in the channel 22 is prevented from advancing rapidly through the pulse positions representing Integrator "1." The marker pulse is advanced slowly through the pulse positions representing Integrator "1" because this integrator is the last integrator to be presented for coding. By advancing the marker pulse slowly through the pulse positions representing the integrator, it is made certain that the system will stop operating immediately after pulse position 1 of Integrator "1" has been presented for coding.

After pulse position 1 of Integrator "1" has been presented for coding, the network formed by the diodes 254, 255, 256, 257, 258, 259 and 260 operates. The network operates at this time because of the particular connections made from the counters 58 and 84 to the cathodes of the diodes 259 and 260, respectively. The network operates at the particular instant that relatively high voltages are simultaneously applied to the cathodes of the diodes 256, 257 and 258 from the plates of the left tubes in the multivibrators 106 and 108 and from the plate of the right tube in the multivibrator 110. This occurs substantially four drum revolutions after the coding has been inserted into the channel 18 or 20 for pulse position 1 of Integrator "1."

When the right tube in the multivibrator 114 becomes cut off upon the operation of the network formed by the diodes 254, 255, 256, 258, 259 and 260, the right tube in the multivibrator 112 becomes cut off in a manner similar to that disclosed above. This causes the network formed by the diodes 390 and 392 (Figure 5) to recirculate the coding information inserted into the channel 18. At the same time, any information inserted into the channel 20 is recirculated by a network similar to that formed by the diodes 390 and 392. The marker pulse in the channel 22 is also recirculated without any shift in pulse position, because of the operation of the network formed by the diodes 296, 316 and 318 (Figure 4). Since the tape 442 (Figure 7) has advanced to its last coded position, the recirculation takes place without the introduction of any new coded information to the computor. This recirculation continues until the movable contact of the switch 124 is pivoted from engagement with the left stationary contact into engagement with the right stationary contact. Upon such pivoting of the movable contact of the switch 124, the analyzer shown in Figure 11 is prepared to obtain the solution of a problem in accordance with the coding inserted in the analyzer.

In order to convert the system disclosed above from automatic operation into a system for providing manual coding, the movable contact of the switch 203 (Figure 3) is pivoted from the left stationary contact into engagement with the right stationary contact. This causes the voltage on the movable contact of the switch 203 to become relatively low. Since this voltage is introduced to the cathodes of the diodes 241 and 254, the networks which include these diodes cannot operate to trigger the right tube in the multivibrator 114 into a state of non-conductivity.

Upon the engagement of the movable contact of the switch 203 with the right stationary contact, the network including the diodes 402, 404, 406, 408 and 410 (Figure 6) also cannot operate. This prevents the tapes 442 (Figure 7) and 460 (Figure 8) from being advanced as information is coded into successive pulse positions in the digital differential analyzer shown in Figure 11. The engagement of the movable contact of the switch 203 with the right stationary contact also causes a relatively low voltage to be applied to the cathode of the diode 414. This prevents the network formed by the diodes 412, 414, 416, 418, 420, 422 and 424 (Figure 6) from operating. In this way, the solenoids 478 and 494 (Figures 6 and 8) cannot be operated to punch a pattern in the tape 460 as the information is coded into successive pulse positions in the analyzer shown in Figure 11.

To commence the coding operation, the switch 282 (Figure 4) is manually closed, and the movable contact of the switch 124 is manually pivoted into engagement with the right stationary contact. The operation of the switches 282 and 124 is similar to that which is provided to place the system in automatic operation. Upon the operation of the switches 282 and 124, a marker pulse is inserted into the channel 22 in pulse position 48 of Integrator "22" in a manner similar to that disclosed above.

In addition to the manual operation of the switches 203, 282 and 124, the switch 340 (Figure 5) is manually closed to initiate the coding of information into the different pulse positions in the channel 18. The switch 370 is also closed, since the tape 442 (Figure 7) is positioned so that the pawl 454 lies above a hole 450. The switch 370 remains closed during the coding operation because of the fact that the tape 442 cannot be advanced from its initial position.

The coding of the information in each pulse position in the analyzer shown in Figure 11 is controlled by the manual operation of the switches 214 and 216 (Figures 2 and 3). When the switch 216 is manually closed, current flows from the battery 132 through the switch and the resistance 215 (Figure 2). The resultant high voltage across the resistance 215 causes current to flow through the diode 212 and the resistance 217 and a relatively high voltage to be produced across the resistance 217 for introduction to the cathode of the diode 210. Since a relatively high voltage is also applied to the cathode of the diode 209 from the plate of the right tube in the multivibrator 112, the voltage on the plates of the diodes becomes relatively high. This voltage in turn causes current to flow through the diode 208 and the resistance 219 and a relatively high voltage to be produced across the resistance. The high voltage across the resistance 219 is inverted by the amplifier 220 and applied to the grid of the left tube in the multivibrator 110 to cut off the tube.

The high volatge produced across the resistance 215 is also applied to an input terminal of the gate circuit 234 (Figure 3). Since the amplifier 123 also produces a relatively high voltage because of the operation of the switch 124, the gate circuit 234 applies a relatively high voltage to the plate of the diode 238, and current flows through the diode and the resistance 239. The resultant high voltage across the resistance 239 is inverted by the amplifier 240 and applied as a relatively low voltage to the grid of the left tube in the multivibrator 114. This low voltage causes the left tube in the multivibrator 114 to become cut off.

When a relatively high voltage is produced across the resistance 215 upon the closure of the switch 216, current flows through the diode 199 (Figure 2) and the resistance 200 and causes a relatively high voltage to be produced across the resistance. This voltage is introduced to the cathode of the diode 197 which forms an "and" network with the diode 196. Since the right tube in the multivibrator 112 is cut off at this time, a relatively high voltage is also introduced to the cathode of the diode 196. This causes a relatively high voltage to be produced on the plates of the diodes 196 and 197, such that a current flows through the diode 194 and the resistance connected to the cathode of the diode. The resultant high voltage on the cathode of the diode 194 is inverted by the amplifier 195 and applied as a relatively low voltage to the grid of the right tube in the multivibrator 108. This low voltage causes the right tube in the multivibrator 108 to become cut off.

The multivibrator 108 remains cut off for two revolutions of the drum. During the two revolutions, the multivibrator 105 and 106 operate in a manner similar to that disclosed above and shown at 500 and 502 in Figure 9. At the end of the second revolution of the drum, the left tube in the multivibrator 108 is triggered into a state of non-conductivity. By requiring the drum to rotate through two revolutions before the left tube in the multivibrator 108 is cut off, stability in the operation of the coding system is assured.

The left tube in the multivibrator 112 is also cut off because of the operation of the gate circuit 226, which operates after the left tubes in the multivibrators 108 and 110 have become cut off. Since the left tube in the multivibrators 112 and 114 are cut off and since the switches 340 (Figure 5) and 370 have been closed and the switch 282 has been opened, the network formed by the diodes 342, 350, 360, 362, 364 and 366 operates.

Because of the connection from the plate of the left tube in the multivibrator 104 to the cathode of the diode 362, the network operates at the instant that the drum 10 has rotated through substantially 1056 pulse positions after the insertion of the marker pulse into the channel 22. This instant corresponds to the time at which the market pulse is presented for reinsertion into the channel 22. When the network formed by the diodes 342, 350, 360, 362, 364 and 366 operates, current flows through the diode 374 and the coil 34 and causes a magnetic signal of relatively high magnitude to be induced in the channel 18 at the proper pulse position.

At the pulse position immediately following the insertion of the new information into the channel 18, the gate circuit 228 (Figure 3) operates. The gate circuit 228 operates at this instant because of the simultaneous introduction to it of high voltages from the multivibrator 114 through the diode 231 and from the multivibrator 105 through the driver stage 179. When the gate circuit 228 operates, it passes a signal to the grid of the right tube in the multivibrator 112 to cut off the tube. This in turn causes the left tube in the multivibrator 112 to become conductive and a relatively low voltage to be produced on the plate of the tube. By producing a relatively low voltage on the plate of the left tube in the multivibrator 112, the further insertion of new information into the channel 18 through the network formed by the diodes 342, 350, 360, 362, 364 and 366 is prevented.

In case it is desired to code a relatively low level of magnetization into a pulse position in the channel 18, the switch 214 (Figures 2 and 3) is closed. Upon the closure of the switch 214, a relatively high voltage is produced across the resistance 213. This voltage causes current to flow through the diode 211 (Figure 2) and the resistance 217 and a relatively high voltage to be produced across the resistance for introduction to the cathode of the diode 210. Since the right tube in the multivibrator 112 is cut off at this time, a relatively high voltage is simultaneously introduced to the cathode of the diode 209. The simultaneous introduction of relatively high voltages to the cathodes of the diodes 209 and 210 causes a relatively high voltage to be produced on the plates of the diodes. This voltage causes current to flow through the diode 208 and the resistance 219 so that a relatively high voltage is produced across the resistance. The high voltage across the resistance 219 is inverted by the amplifier 220 and introduced as a relatively low voltage to the grid of the left tube in the multivibrator 110 to cut off the tube. After the left tube in the multivibrator 110 becomes cut off, the left tube in the multivibrator 112 becomes cut off in a manner similar to that disclosed above.

The relatively high voltage produced across the resistance 213 when the switch 214 is closed is also introduced to the plate of the diode 261. This high voltage causes current to flow through the diode 261 and the resistance 283 so that a relatively high voltage is produced across the resistance 283 for introduction to the cathode of the diode 263. Since a relatively high voltage is also introduced to the cathode of the diode 264 from the output terminal of the amplifier 123 the voltage on the plates of the diodes becomes relatively high. This voltage causes current to flow through the diode 273 and the resistance 276 so that a relatively high voltage is produced across the resistance. The high voltage across the resistance 276 is inverted by the amplifier 277 and applied as a relatively low voltage to the grid of the right tube in the multivibrator 114 to cut off the tube.

When the right tube in the multivibrator 114 is cut off, the left tube in the multivibrator starts to conduct and causes a relatively low voltage to be produced on its plate. Since this relatively low voltage is introduced to the cathode of the diode 366 (Figure 5), the network formed by the diodes 342, 350, 360, 362, 364 and 366 cannot operate. The failure of the network to operate prevents current from flowing through the coil 34 and causes a relatively low level of magnetization to be induced by the coil 34 in the appropriate position in the channel 18.

After the proper information for a particular pulse position such as pulse position 48 of Integrator "22" has been inserted into the channel 18 by the closure of either the switch 214 or the switch 216, the marker pulse is shifted in the channel 22 to the next position. For example, the marker pulse would be shifted from pulse position 48 to Integrator "22" to pulse position 47 of Integrator "22." The marker pulse is shifted one pulse position by the operation of the network formed by the diodes 295, 299, 306, 308 and 310 (Figure 4). The network is prepared for operation when the left tube in the multivibrator 112 becomes cut off. As previously disclosed, the left tube in the multivibrator 112 becomes cut off after either the switch 214 or the switch 216 is closed and just before the information represented by the closing of either the switch 214 or 216 is recorded in the channel 18.

The network formed by the diodes 295, 299, 306, 308 and 310 operates to shift the marker pulse one pulse position because of the connection from the plate of the left tube in the multivibrator 103 to the cathode of the diode 306. As previously disclosed, the voltage on the plate of the left tube in the multivibrator 103 becomes relatively high at a position substantially 1055 positions after the previous insertion of the marker pulse. This corresponds to a time substantially one pulse position before the marker pulse is presented for reinsertion into the channel 22.

Two pulse positions after the network formed by the diodes 295, 299, 306, 308 and 310 (Figure 4) has operated to shift the marker pulse by one pulse position, the gate circuit 228 operates. The gate circuit operates at this time because of the simultaneous introduction of relatively high voltages from the amplifier 232 (Figure 3) and the driver stage 179. The voltage from the amplifier 232 is relatively high since the amplifier inverts the relatively low voltage that it receives from the switch 203. This voltage causes current to flow through the diode 230 and the resistance 229 and a relatively high voltage to be produced across the resistance for introduction to the gate circuit 228. The driver stage 179 passes a relatively high voltage at this time because of its association with the left tube in the multivibrator 105.

When the gate circuit 228 operates, it triggers the right tube in the multivibrator 112 into a state of non-conductivity. When the right tube in the multivibrator 112 becomes cut off, it causes the network formed by the diodes 296, 316 and 318 to operate. This network operates to recirculate the marker pulse in its new position in the channel 22.

The marker pulse continues to recirculate in its new position in the channel 22 until either the switch 214 or the switch 216 is closed. If the switch 216 is closed, a relatively high level of magnetization is induced in the appropriate position in the channel 18, and a relatively low level of magnetization is induced in this position if the switch 214 is closed. In this way, the appropriate information may be inserted into each pulse position in the channel 18 by the closure of the switches 214 and 216. After the channel 18 has been properly coded, the process may be repeated for the channel 20.

As may be seen, the digital differential analyzer shown in Figure 11 is coded much more quickly by the automatic operation of the system shown in Figures 1 to 8, inclusive, than by the manual operation of this system. The automatic operation is much faster than the manual operation since it eliminates the need for manually closing either the switch 214 or the switch 216 for each pulse position. Furthermore, the speed of the coding system during automatic operation is increased because of the rapid advance of the coding operation through integrators not required for use in the solution of a particular problem. The automatic system is also more accurate than the manual system since it eliminates the element of human error involved when an operator closes the switch 214 instead of the switch 216 or vice versa. The accuracy of the system in automatic operation is also enhanced because of the check provided by the pattern punched in the tape 460.

It should be appreciated that the multivibrators 103, 104, 105, 106, 108, 110, 112, 114 and 116 operate in the system disclosed above only during the coding of the analyzer shown in Figure 11. Since they would otherwise remain idle during the periods of actual computation, they may be combined with multivibrators forming a part of the analyzer which is coded by the system shown in Figures 1 to 8, inclusive. Thus the multivibrators 104 and 105 may respectively serve as the $Z_a$ and $Z_b$ flip-flops shown in Figure 14 of co-pending application Serial No. 217,478. In like manner the functions of the multivibrators 110 and 112 may be combined with the $G_1$ and $G_2$ flip-flops shown in Figure 47 of co-pending application Serial No. 217,478, and the functions of the multivibrator 114 may be combined with the functions of the $X_1$ flip-flop shown in Figure 49 of the co-pending application.

In order to further indicate the logical operation of the system shown in Figures 1 to 8, inclusive, the mathematical equations governing their operation will now be set forth. In these equations, various symbols are employed to designate the different components shown in Figures 1 to 8, inclusive. For example, the multivibrators shown in the figures are designated by the following symbols:

$Z_r$—multivibrator 103
$Z_a$—multivibrator 104
$Z_b$—multivibrator 105
$Z_c$—multivibrator 106
$Z_h$—multivibrator 108
$G_1$—multivibrator 110
$G_2$—multivibrator 112
X—multivibrator 114

When a relatively high voltage exists on the plate of the left tube in a multivibrator, only the symbol designating the multivibrator is used. This symbol is provided in capital letters. For a condition where a relatively high voltage exists on the plate of the right tube in the multivibrator, a prime mark (′) is placed after the symbol designating the multivibrator. For example, for the multivibrator 103 the two voltage possibilities would be $Z_r$ for a high voltage on the plate of the left tube and $Z_r'$ for a high voltage on the plate of the right tube.

The voltages introduced to the grids of the two tubes in each multivibrator are also indicated by the symbols designating the multivibrator. However, the voltages introduced to the grids of the multivibrator tubes are designated by small letters in contrast to the capital letters which indicate the voltages on the plates of the tubes. Only the symbol designating the multivibrator is used to indicate the voltage applied to the grid of the left tube in the multivibrator. A subscript of zero (0) is provided in front of the symbol to indicate the voltage applied to the grid of the right tube in the multivibrator. For example, the voltage introduced to the grids of the left and right tubes in the multivibrator 103 are indicated by $z_r$ and ${}_0z_a$.

Symbols are also provided to indicate the various switches shown in Figures 1 to 8, inclusive. These symbols are as follows:

Switch 124—$\phi+\theta$
Switch 203—$\mu$
Switch 214—$\circledcirc$
Switch 216—$\textcircled{1}$
Switch 282—E
Switch 290—$\gamma$
Switch 340—$\alpha$
Switch 370—Y When a relatively high voltage is produced on the movable contact of a switch, the voltage is indicated by the symbol designating the switch. For a condition where a relatively low voltage is produced on the movable contact of the switch, a prime symbol (′) is added to the symbol designating the switch. For example, when the movable contact of the switch 282 is at substantially the voltage of the battery 132, the voltage is indicated by the symbol E. When the movable contact of the switch 282 is substantially at ground potential, the voltage is indicated by the symbol E′.

When a relatively high voltage is introduced to the coil 44, it is indicated by the symbol $Z_0$. A relatively high voltage produced on the coil 102 is indicated by the symbol $Z_{rm}$. Similarly, a relatively high voltage introduced to the coil 34 is indicated as $Y_0$. A relatively high voltage produced by the coil 32 is indicated as $Y_a$, and a relatively high voltage produced on the movable contact of the switch 370 is indicated as $Y_b$. The relatively high voltage required to energize the solenoids 426, 428, 429 and 430 is indicated by the symbol A. In like manner, the symbol B indicates the relatively high voltage required to energize the solenoid 478 for punching a hole 482 in the tape 460. As previously disclosed, a particular integrator in the computer is indicated by the capital letter I followed by an appropriate numerical subscript. For example, Integrator "3" would be indicated by $I_3$. A particular pulse position in the integrator would be indicated by the capital letter P followed by the appropriate numerical subscript. For example, pulse position 13 would be indicated by $P_{13}$. Each clock pulse produced by the coil 50 is designated by the capital letter C.

In accordance with the symbols designated above, the logical equations for operating the system shown in Figures 1 to 8, inclusive, are follows:

$$z_r=(G_2'+\phi'\theta')Z_{rm}C$$
$${}_0z_r=(G_2'+\phi'\theta')Z_{rm}'C$$
$$z_a=(G_2'+\phi'\theta')Z_rC$$
$${}_0z_a=(G_2'+\phi'\theta')Z_r'C$$
$$z_b=(G_2'+\phi'\theta')Z_aC$$
$${}_0z_b=(G_2'+\phi'\theta')Z_a'C$$
$$z_c=\phi'\theta'Z_c'Z_bC+\mu\phi'\theta'Z_rG_2P_{47}C$$
$${}_0z_c=\phi'\theta'Z_cZ_bC$$
$$z_h=\phi'\theta'Z_h'Z_cZ_bC+\mu\phi'\theta'Z_rG_2P_{47}C$$
$${}_0z_h=\phi'\theta'Z_hZ_cZ_bC+G_2'(\circledcirc+\textcircled{1})$$
$$g_1=G_2'(\circledcirc+\textcircled{1})+\mu\phi'\theta'(P_1'+I_1')G_1'Z_hZ_cZ_bC$$
$${}_0g_1=\phi'\theta'G_1Z_hZ_cZ_bG_2'C$$
$$g_2=\phi'\theta'G_1Z_hZ_c'Z_{rm}C$$
$${}_0g_2=\phi'\theta'(X+\mu)Z_bC$$
$$x=\phi'\theta'\textcircled{1}+\mu\phi'\theta'Z_rG_2P_{47}C$$
$${}_0x=\phi'\theta'(\circledcirc+E)+\mu\phi'\theta'Z_h'G_1P_{48}I_1'YZ_bC+\mu\phi'\theta'Z_cZ_hG_1'P_1I_1Z_bC$$
$$Z_0=G_2\gamma E'Z_b+G_2\gamma'\phi'\theta'E'Z_r+P_{48}I_{22}\phi'\theta'E+G_2'Z_aE'$$
$$Y_0=Y_a(G_2'+\phi'\theta'E)+XY_b\alpha E'G_2Z_a+Y_a\alpha E'Z_a'+Y_a\alpha'\phi'\theta'E'$$
$$A=\mu\phi'\theta'XZ_h'G_1'$$
$$B=\mu\phi'\theta'XZ_cZ_hG_1Z_bY_a$$

In the above equations, two or more symbols written in juxtaposition to each other designate an "and" network.

For example, the equation for $A=\mu\phi'\theta'XZ_h'G_1'$ indicates an "and" network in which all of the propositions in the network must be simultaneously true for the network to operate. A plus (+) sign indicates an "or" network in which a proposition becomes true as long as any one of the conditions in the equation representing the proposition becomes true. For example, in the equation representing $Z_0$ above, a relatively high voltage is produced for $Z_0$ when either $G_2\gamma E'Z_b$, $G_2\gamma'\phi'\theta'E'Z_r$, $P_{48}I_{22}\phi'\theta'E$ or $G_2'Z_aE'$ becomes true.

It should be appreciated that the system shown in Figures 1 to 8, inclusive, and disclosed above can be operated with other digital differential analyzers than that shown in Figure 11 and disclosed in co-pending application Serial No. 217,478. For example, the system shown in Figures 1 to 8, inclusive, can be easily adapted for use with the digital differential analyzer disclosed in co-pending application Serial No. 263,152, filed December 26, 1951, by Glenn E. Hagen et al.

It should also be appreciated that the system shown in Figures 1 to 8 inclusive, can be used in digital computers which are provided with a plurality of pulse positions. The system shown in Figures 1 to 8 inclusive, can especially be used in digital computers where the pulse positions are subdivided into pluralities of groups each having a plurality of pulse positions and each operating independently of the other groups.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a digital differential analyzer including a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, control means coded for each pulse position in the memory means in a pattern dependent upon a problem to be solved, means for converting the coded information in each position of the control means into corresponding electrical signals for recordation in the analyzer, a plurality of multivibrators connected to the analyzer to prepare the analyzer for the recordation of signal information in each pulse position in the memory means a particular time after the recordation of the signal information in the memory means in the previous pulse position, means for recording the signal information in each pulse position in the memory means in accordance with the coded information provided by the control means for the pulse position, and means for advancing the control means within the particular time to the next pulse position upon the recordation in the memory means of the signal information in the previous pulse position of the control signal means.

2. In combination, a digital differential analyzer including a plurality of integrators, means including memory means and first plurality of counting stages in the analyzer for subdividing the memory means into a plurality of integrator storage sections, means including the memory means and second plurality of counters in the analyzer for subdividing each integrator storage section into a plurality of pulse positions, means for sequentially presenting each integrator and each pulse position in the integrator for computation, control means coded for each pulse position in the memory means in accordance with a problem to be solved, means for converting the coded information in each pulse position of the control means into a corresponding electrical signal for recordation in the appropriate pulse position of the memory means, means for recording the electrical signal into the appropriate pulse-position of the memory means, and means for advancing the control means to the next pulse position after the recordation in the analyzer of the electrical signal in the previous pulse position of the memory means.

3. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator into a plurality of pulse positions, means for sequentially presenting each integrator and each pulse position in the associated integrator storage section for computation, control means having a punched code to indicate the amplitude of the electrical signal to be provided at each pulse position in the memory means, means operative in conjunction with the control means to produce an electrical signal having an amplitude corresponding to the code provided for each position in the control means, a plurality of multivibrators connected to the anlyzer for preparing the analyzer for the recordation of signal information in the memory means in one pulse position upon the recordation of the signal information in the memory means in the previous pulse position and after each pulse position in each integrator storage section has been presented for computation a particular number of times, means for recording the signal information in each pulse position in the memory means in accordance with the coded information for the pulse position in the control means and means for advancing the control means to the next pulse position upon the recordation of the signal information in the memory means in the previous pulse position and during the preparation of the analyzer for the recordation of the signal information in the memory means in the next pulse position.

4. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, control means coded to indicate the amplitude of the electrical signal to be provided at each pulse position in the memory means, means operative in conjunction with the control means to produce an electrical signal having an amplitude corresponding to the code provided for each position in the control means, a plurality of bistable members connected to the analyzer for preparing the analyzer for the recordation of signal information in the memory means in one pulse position upon the recordation of the signal information in the memory means in the previous pulse position and after each pulse position in each integrator has been presented for computation a particular number of times, means for recording the electrical signal in the appropriate pulse position of the memory means, means for advancing the control means to the next pulse position upon the recordation of the signal information in the memory means in the previous pulse position and during the preparation of the analyzer for the recordation of the signal information in the memory means in the next pulse position, means for preventing any recordation in the memory means of signal information for the integrators not involved in the solution of the problem, and means for presenting for recordation adjacent pulse positions in the memory means for integrators not involved in the computation in a time considerably less than that required to present for recordation adjacent pulse positions in the memory means for the integrators required in the computation so as to minimize the time required to code the memory means.

5. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, master control means coded for each pulse position in the memory means in accordance with the problem to be solved, means for converting the coded information in each pulse position of the control means into a corresponding electrical signal for recordation in the appropriate pulse position of the memory means, means for recording each electrical signal into the appropriate pulse position in the memory means, means for advancing the control means to the next pulse position after the recordation in the memory means of the coded information for the previous pulse position, and recording means for recording the signal information inserted into the memory means to provide a check for the proper coding of the memory means.

6. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, means for providing coded indications of the signal patterns to be produced in the memory means in the different pulse positions for the different integrators in accordance with the problem to be solved, means for sequentially inserting electrical signals in each pulse position in the memory means in accordance with the coded indications for the position, and means for producing a duplicate set of coded indications in accordance with the signal patterns provided in the memory means so as to obtain a check as to the proper coding of the memory means.

7. In combination, a digital differential analyzer comprising a plurality of integrators, means including memory means and a first plurality of counting stages for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, control means coded in a pattern dependent upon the problem to be solved and adapted to control the insertion of signal information into the different pulse positions in the memory means, a plurality of bistable members connected to the analyzer to control the insertion of the signal information into the memory means for the different pulse positions, a plurality of gate circuits associated with the bistable members to control the operation of the bistable members, means including the bistable members and the gate circuits for preparing the analyzer for the insertion of signal information into one pulse position in the memory means a particular time after the insertion of the signal information into the previous position in the memory means, and means for recording the signal information in the memory means at the proper pulse position in accordance with the coded information provided by the control means for the pulse position.

8. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, a tape coded in a pattern dependent upon the problem to be solved and adapted to control the insertion of signal information into the different pulse positions in the memory means, a plurality of multivibrators connected to the analyzer to control the insertion of the signal information into the memory means, a plurality of gate circuits associated with the multivibrators to control the operation of the multivibrators, means including particular multivibrators in the plurality and particular gate circuits in the plurality for preparing for the insertion of signal information into one pulse position in the memory means upon the insertion of the signal information into the previous position in the memory means and after each pulse position in the memory means has been subsequently presented for computation a particular number of times, means for recording the signal information into each pulse position in the memory means in accordance with the coded information provided by the tape for the pulse position, and means including particular multivibrators in the plurality and particular gate circuits in the plurality for controlling an advance of the tape from one pulse position to the next upon the insertion into the memory means of the signal information for the first position and during the period that each pulse position in the memory means is presented for computation for the particular number of times.

9. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, control means coded for each pulse position in the memory means in a pattern dependent upon the problem to be solved, a plurality of bistable members connected to the analyzer, a plurality of gate circuits each having a plurality of connections to the analyzer and the bistable members to thereby operate the bistable members in a particular sequence upon the recordation in the memory means of the signal information for one pulse position, means for advancing the control means to the next pulse position during the operation of the bistable members in the particular sequence, and means for recording in the memory means the signal information for the next pulse position after the operation of the bistable members in the particular sequence.

10. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, control means coded for each pulse position in the memory means in a pattern dependent upon the problem to be solved, a plurality of bistable members connected to the analyzer, a plurality of gate circuits each having a plurality of input connections from the analyzer and the bistable members to operate the bistable members in a particular sequence upon the recordation in the memory means of the signal information for one pulse position, means including particular bistable members and particular gate circuits in the plurality for advancing the control means to the next pulse position during the operation of the bistable members in the particular sequence, means including particular bistable members and particular gate circuits in the plurality for recording in the memory means the signal information for the next pulse position after the operation of the bistable members in the particular sequence, means including particular bistable members and particular gate circuits in the plurality for minimizing the time required for inserting signal information for adjacent pulse positions in the integrators not required in the solution of a problem, and means for delaying the advance of the control means during the insertion of signal information into the pulse positions of integrators not required in the solution of the problem.

11. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, means for providing coded indications of the signal patterns to be produced in the memory means in the different pulse positions for the different integrators in accordance with the problem to be solved, means for sequentially inserting signals in each pulse position in the memory means in accordance with the coded indications for the position, means operative upon the presentation for computation of integrators not required in the solution of the problem to insert in the memory means in the different pulse positions for the integrators signal information in a minimum amount of time and representing a value for producing no effect during the operation of the analyzer to solve the problem, and means for producing a duplicate set of coded indications in accordance with the signal patterns provided in the memory means so as to obtain a check as to the proper coding of the memory means.

12. In combination, a computer operative by digital steps to obtain the solution of a mathematical problem, means including memory means in the computer for providing a plurality of pulse positions in the memory means for computation in the solution of the mathematical problem, means for sequentially and on a recurrent basis presenting each pulse position in the memory means for computation, coding means for providing coded indications representing the signal amplitude to be inserted in the memory means for each pulse position, means for converting the coded indications in each pulse position in the coding means into corresponding electrical signals, a plurality of bistable members, means including a first plurality of networks associated with the bistable members and operative upon the members to provide a recordation in the memory means of the electrical signal for each pulse position, recording means for recording coded indications representing the electrical signals inserted into the memory means for each pulse position, means including a second plurality of networks associated with the bistable members and operative upon the members to provide in the recording means coded indications representing the signal recorded in the memory means for each pulse position, means including a third plurality of networks associated with the bistable members and operative to provide an advance of the coding means and of the recording means from one pulse position to the next after the proper signal information for the first pulse position has been recorded in the memory means and has been recorded in the recording means.

13. In combination, a computer operative by digital steps to obtain the solution of a mathematical problem, means including memory means in the computer for providing a plurality of pulse positions in the memory means for computation in the solution of the mathematical problem, means including the memory means and a plurality of counters in the computer for subdividing the pulse positions in the memory means into a plurality of groups each having a plurality of pulse positions, master coding means for providing coded indications representing the amplitude of the electrical signal to be inserted in each pulse position in the memory means, means for converting the coded indications in each pulse position in the master coding means into corresponding electrical signals, a plurality of bistable members, means including a first plurality of networks associated with the bistable members and operative upon the members to provide a recordation in the memory means of the electrical signal for each pulse position, means including a second plurality of networks associated with the bistable members and operative upon the members to provide an advance of the master coding means from one pulse position to the next after the proper signal information has been recorded in the memory means for the first pulse position, and means including a third plurality of networks associated with the bistable members, the last mentioned means being operative upon the presentation for computation of groups not required in the solution of the problem to insert in the memory means in the different pulse positions for the groups signal information in a minimum amount of time and representing a value for producing no effect during the operation of the computer to solve the problem.

14. In combination, a computer operative by digital steps to obtain the solution of a mathematical problem, means including memory means in the computer for providing a plurality of pulse positions in the memory means for computation in the solution of the mathematical problem, means for sequentially presenting each pulse position in the memory means for computation, control means for providing coded indications representing the amplitude of the electrical signal to be inserted in each pulse position in the memory means, means for converting the coded indications in each position in the control means into corresponding electrical signals, a plurality of bistable members, means including a first plurality of networks associated with the bistable members and operative upon the members to provide a recordation in the memory means of the electrical signal for each pulse position, means including a second plurality of networks associated with the bistable presentation of each pulse position in the memory means for computation a particular number of times after the recordation of signal information in the memory means for a pulse position, to prepare the memory means for the recordation of signal information in the next position, and means including a third plurality of networks associated with the bistable members and operative upon the members to prevent the coding of signal indications in the memory means for pulse groups not required in the solution of the mathematical problem and to provide for a minimization of time between the last pulse position in each group required in the solution of the problem and the first pulse position in the next group required in the solution of the problem.

15. In combination, a digital differential analyzer comprising a plurality of integrators, means including memory means and a first plurality of counting stages in the analyzer for subdividing the memory means into a plurality of integrator storage sections, means including the memory means and a second plurality of counting stages in the analyzer for subdividing each integrator storage section into a plurality of pulse positions, means for sequentially presenting each integrator and each pulse position in the associated integrator storage section for computation, master coding means coded for each position in the memory means in a pattern dependent upon the problem to be solved, a master switch operative in a first position to provide for the automatic insertion of signal information into each pulse position in the memory means in accordance with the coded indications presented by the coding means and operative in a second position to provide for the manual insertion of signal information into each pulse position in the memory means, a plurality of bistable members, means including a first plurality of networks operative upon the bistable members in the first position of the switch to provide for the insertion of the proper signal information into each pulse position in the memory means in accordance with the coded indications presented by the coding means, means including a second plurality of networks operative upon the bistable members in the first position of the switch to provide for the advance of the memory means and of the master coding means from one pulse position to the next upon the insertion of the proper signal information into the first pulse position in the memory means, and means including a third plurality of networks operative upon the bistable members in conjunction with the first and second pluralities of networks, in the second position of the switch, to disassociate the master coding means from controlling the insertion of new signal information into the analyzer, the last mentioned means also being operative upon the bistable members in conjunction with the first and second pluralities of networks, in the second position of the switch, to provide for the manual insertion of signal information into each pulse position in the memory means and for the advance of the memory means to a successive pulse position after the insertion of signal information in the previous position.

References Cited in the file of this patent

UNITED STATES PATENTS

| | | |
|---|---|---|
| 2,604,262 | Phelps et al. | July 22, 1952 |
| 2,651,458 | Bennett | Sept. 8, 1953 |
| 2,679,638 | Bensky | May 25, 1954 |
| 2,701,095 | Stibitz | Feb. 1, 1955 |
| 2,737,342 | Nelson | Mar. 6, 1956 |
| 2,767,908 | Thomas | Oct. 23, 1956 |
| 2,789,759 | Tootill et al. | Apr. 23, 1957 |

FOREIGN PATENTS

| | | |
|---|---|---|
| 1,014,373 | France | June 11, 1952 |